US007707413B2

(12) United States Patent
Lunt et al.

(10) Patent No.: US 7,707,413 B2
(45) Date of Patent: Apr. 27, 2010

(54) SYSTEMS AND METHODS FOR PROTECTING PRIVATE INFORMATION IN A MOBILE ENVIRONMENT

(75) Inventors: Teresa F Lunt, Palo Alto, CA (US); Daniel H Greene, Sunnyvale, CA (US); Philippe J Golle, San Francisco, CA (US); Richard H Bruce, Los Altos, CA (US); Jessica N Staddon, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1042 days.

(21) Appl. No.: 11/004,748

(22) Filed: Dec. 2, 2004

(65) Prior Publication Data

US 2006/0123462 A1 Jun. 8, 2006

(51) Int. Cl.
 *H04L 9/32* (2006.01)
(52) U.S. Cl. .......................... 713/168; 726/27; 726/28; 726/29; 726/30
(58) Field of Classification Search .................. 713/200
 See application file for complete search history.

(56) References Cited

U.S. PATENT DOCUMENTS

| 7,100,195 | B1* | 8/2006 | Underwood | 726/2 |
| 2002/0174236 | A1* | 11/2002 | Mathur et al. | 709/229 |
| 2003/0018483 | A1* | 1/2003 | Pickover et al. | 705/1 |
| 2004/0107368 | A1* | 6/2004 | Colvin | 713/202 |
| 2004/0117663 | A1* | 6/2004 | Colvin | 713/202 |
| 2005/0131757 | A1* | 6/2005 | Chan et al. | 705/14 |
| 2006/0123461 | A1* | 6/2006 | Lunt et al. | 726/1 |
| 2006/0123462 | A1* | 6/2006 | Lunt et al. | 726/1 |
| 2007/0027712 | A1* | 2/2007 | Lapsker | 705/2 |
| 2007/0261125 | A1* | 11/2007 | Ginter et al. | 726/27 |
| 2009/0076916 | A1* | 3/2009 | Kim et al. | 705/14 |

OTHER PUBLICATIONS

U.S. Appl. No. 11/003,688, Teresa F. Lunt et al.
Latanya Sweeney, "k-Anonymity: A Model for Protecting Privacy", International Journal on Uncertainty, Fuzziness and Knowledge-based Systems, 10 (5), 2002; 557-570.
Jessica Staddon, "Dynamic Inference Control", DMKD03: 8th International Workshop on Research Issues in Data Mining and Knowledge Discovery, 2003.

(Continued)

*Primary Examiner*—Kambiz Zand
*Assistant Examiner*—Dant B Shaifer Harriman
(74) *Attorney, Agent, or Firm*—Park, Vaughan & Fleming LLP

(57) ABSTRACT

Techniques for protecting non-public information in a mobile environment are provided. A request for non-public information about users in a mobile environment is received. Privacy policies, non-public and optional public information about the users affected by the request are determined. An optional privacy impact indicator is determined based on how satisfying the request increases the current public information about the users. Crowds of users having similar attribute name/values are optionally determined. User and optional requestor privacy policies which associate threshold release criteria such minimum crowd size, minimum consideration with the non-public information are determined. A privacy agreement is reached for the disclosure of the requested non-public information based on the compatibility of the requester and user privacy policies. Privacy protecting transformations are optionally determined and applied to create crowds or groups associated with the requested attribute.

84 Claims, 14 Drawing Sheets

OTHER PUBLICATIONS

Latanya Sweeney, "Finding Lists of People on the Web", ACM Computers and Society, 34(1) Apr. 2004.

R. Lukose, E. Adar, J. Tyler, "Shock: Communicating with Computational Messages and Automatic Private Profiles", WWW 2003, May 2003, Budapest, Hungary, ACM.

E. Adar, C. Sengupta, J. Tyler, N. Good, "Shock: Aggregating Information While Preserving Privacy" Information Systems Frontiers 5:1, 15-28, 2003, Kluwer Academic Publishers.

Shanti Shankarkumar, "Rakesh Mathur's Karma Yoga", Mar. 3, 2000, downloaded from URL: http://www.rediff.com/us/2000/mar/03us1.htm.

Latanya Sweeney, "Navigating Computer Science Research Through Waves of Privacy Concerns", Carnegie Mellon University, School of Computer Science, Tech Report, CMU 03-165, CMU-ISRI-03-102, Pittsburgh, Jul. 2003.

M. Freedman, K. Nissim, B. Pinkas, "Efficient Private Matching and Set Intersection", Advances in Cryptology—Eurocrypt '2004 Proceedings LNCS 3027, Springer Verlag, pp. 1-19 May 2004.

Pierangela Samarati, Latanya Sweeney, "Protecting Privacy When Disclosing Information: k-Anonymity and Its Enforcement Through Generalization and Suppression", Proceedings of the IEEE Symposium on Research in Security and Privacy, May 1998, Oakland, CA.

\* cited by examiner

| | |
|---|---|
| DOB | 1/1/1971 |
| SEX | M |
| STREET | 1010 MAIN ST. |
| STATE | CA |
| RECREATIONAL INTERESTS | RUNNING |
| LANGUAGES | ENGLISH/FRENCH/GERMAN |
| SOCIETY MEMBERSHIPS | ACM/IEEE |
| CITY | PALO ALTO |
| COUNTRY | USA |
| WORK INTERESTS | COMPUTERS/PETRI NETS/GRAPH ALGORITHMS |
| UNDERGRADUATE | UC BERKELEY |
| GRADUATE SCHOOL | UC LOS ANGELES |

*FIG. 11*

| ATTRIBUTE 1 | ATTRIBUTE2 | ATTRIBUTE3 | ATTRIBUTE4 | ADVERTISING DISPLAY |
|---|---|---|---|---|
| LOCATION: X=23.5;Y=45.2; Z=1.2; | SELF.CLOTHING. INSEAM.SIZE =30; | SELF.CLOTHING. COLOURS ={RED \| GREEN}; | CHILDREN.NUMBER =2; | FTP://FTP.ADS.COM/ FILE001.MPG; |
| LOCATION: NEARBY FILE001.MPG | SELF. INTERESTS. OPERA.=HIGH; | SELF.NEEDS. CLOTHING. FORMAL.=HIGH; | | FTP://FTP.ADS.COM/ FILE005.MPG; |
| LOCATION: NEAR BOOKSELLER_1; | SELF.INTERESTS. BOOKS.GENRE= "HISTORY"; | SELF.INTERESTS. BOOKS.GENRE= "ROMANCE"; | SELF.INTERESTS. BOOKS.GENRE= "MYSTERY"; | {DISPLAY_TO_CROWD ([SELECT TITLE, ISBN, PRICE FROM INVENTORY WHERE (INVENTORY.GENRE = 'ROMANCE' OR INVENTORY.GENRE = 'MYSTERY' OR INVENTORY.GENRE = 'HISTORY')]); DISPLAY FTP://FTP.ADS.COM/ [ISBN].MPG; DISPLAY COUPON01; } |

FIG. 13

SYSTEMS AND METHODS FOR PROTECTING PRIVATE INFORMATION IN A MOBILE ENVIRONMENT

INCORPORATION BY REFERENCE

This application is related to: entitled "SYSTEMS AND METHODS FOR PROTECTING PRIVACY" by Terresa Lunt et al., filed Dec. 2, 2004 as U.S. patent application Ser. No. 11/003,688; herein incorporated by reference in its entirety.

BACKGROUND OF THE INVENTION

1. Field of Invention

This invention relates to protecting non-public information.

2. Description of Related Art

Conventional systems for protecting information privacy determine quasi-identifiers in data sets useful in re-identifying individual subjects. These conventional systems attempt to generalize, hide or withhold quasi-identifiers in the data sets to protect the privacy of individuals. For example, a subject's salary information can be hidden within aggregate salary information for a group.

Other conventional systems for protecting privacy attempt to generalize the information to prevent re-association with specific subjects. For example, some of these systems replace some or all digits of a subject specific identifier with wildcards to generalize the identifier. In this way, a group of subjects is created in which the group is associated with a non-subject specific identifier. The group lessens the impact of information disclosures on any specific subject while allowing the release of interesting aggregate information.

Samarati et al. in "Protecting Privacy when Disclosing Information: k-Anonymity and Its Enforcement through Generalization and Suppression", Technical Report, SRI International, March 1998, describe a system for protecting privacy based on a theory of k-anonymity. Samarati et al. propose granular access to any sensitive information by applying the minimal set of generalization transformations necessary to create desired groups of size at least "k". The subject identifying portions of the information are transformed by these generalizations.

These conventional privacy protecting systems assume that access to the underlying data source is available. However, in a typical data-mining environment, the underlying data sets are not necessarily available for access. Moreover, these conventional systems do not work well in mobile environments. Although some conventional systems aggregate subject specific information before it is disclosed to a third party, all personal data must be disclosed to the aggregator. This is often unacceptable in a mobile environment.

Conventional privacy protecting systems also assume that all the relevant information for a large group of subjects is simultaneously available in a single location. However, information about mobile users is not always centralized and/or if centralized is not usually available from the network operator. In mobile environments, subject devices such as mobile phones, WiFi-enabled personal digital assistants and the like are typically associated with unique identifiers. The unique identifiers are useful in re-associating specific information with subjects over multiple sessions. Thus, if the extracted knowledge or mined information associated with the session identifier information is not properly protected and/or anonymized, it may be re-associated with individual subjects by combining it with public information. Therefore, systems and methods for protecting extracted knowledge or data in a mobile environment would be useful.

SUMMARY OF THE INVENTION

The systems and methods according to this invention provide for protecting non-public information in a mobile environment. A query for non-public information is received. Information previously released by the user to the same or a different requester of information, non-public information, optional publicly available information about the users and/or the requester, and optional privacy policies are determined for one or more users. User privacy policies are associated with the attribute names, values, required crowd size, consideration required to disclose identifying information and/or other possible requirements. Crowds of users associated with the same and/or similar requested attributes or features are optionally determined. A privacy impact indicator is optionally determined based on the privacy consequences of releasing the requested information. The privacy consequences may include, but are not limited to an increase in the publicly available information about a user, whether releasing the requested information violates the user's privacy policy, and the like. Privacy protecting transformations are optionally determined and applied to the user's data before replying to the query, based on the user's privacy policy, the requestor's privacy policy and optional publicly available information about the users.

BRIEF DESCRIPTION OF THE DRAWINGS

FIG. 11 is an exemplary survey for gathering non-public personal information about a user;

FIG. 13 is an exemplary data structure for storing advertising asset information according to this invention.

DETAILED DESCRIPTION OF EXEMPLARY EMBODIMENTS

Figure 1:
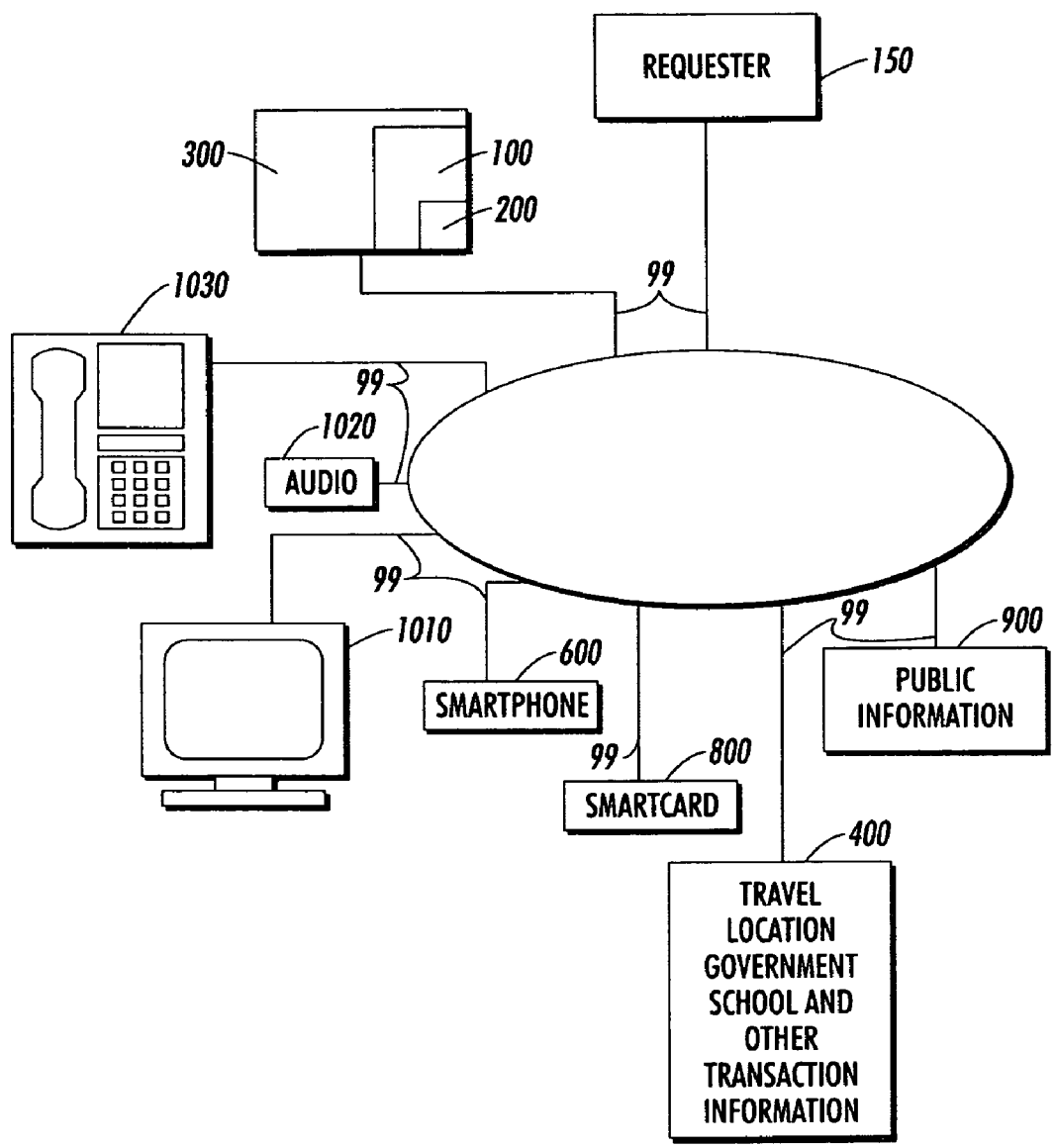
FIG. 1 shows an overview of a first exemplary system for protecting non-public information according to this invention.

FIG. 1 shows an overview of a first exemplary system for protecting non-public information 100 according to this invention. The system for protecting non-public information 100 is embedded within a home gateway 300 and connected to data source 400; a smartphone 600; a smartcard 800; a video viewing device 1010; an audio device 1020; a telecommunications device 1030 and public information source 900 over communication links 99. A requestor 150 submits a request for non-public information. The requestor 150 is a public or non-public entity such as an individual, an organization and/or a system seeking access to the non-public information secured by the system for protecting non-public information 100. The exemplary data source 400 may include, but is not limited to, travel, location, government, school, health, financial, sales and/or any known or later developed type of non-public information about a user. In various embodiments according to this invention, the non-public information may be held by various $3^{rd}$ party entities. The release of the non-public information is controlled by the user.

The public information source 900 contains information publicly known about a user. Public information is information about a subject that has already been released, is widely known and is easily obtained. In various exemplary embodiments according to this invention, the public information is optionally purchased from a public information repository, or may be made available without charge. For example, the public information 900 may contain information about the user's address and telephone numbers listed in telephone directories and the like. However, it will be apparent that any type of publicly available information may be optionally stored in the public information source 900.

In one of the various exemplary embodiments according to this invention, the system for protecting non-public information 100 is optionally embedded within the personal computer or server 300. In various other embodiments according to this invention, the system for protecting non-public information 100 is embedded in a personal computer, a workstation and/or in any fixed or mobile device accessible via communications links 99. The system for protecting non-public information 100 controls and/or mediates access to information about a user encoded within the data structure for storing non-public information 200. The non-public information is stored within a mobile device, the smartcard 800, in a central encrypted repository, within the user's home gateway 300, a router, a personal computer, the smartphone 600, or at any other location accessible over a communications medium. The user's non-public information encoded within the data structure for storing non-public information 200 includes information that is not widely known. For example, the non-public information includes, but is not limited to the user's net worth, color preferences, clothing size and the like.

In various other exemplary embodiments according to this invention, the non-public information includes, but is not limited to medical records, x-rays, pharmacy records, genetic profiles, previous adverse drug interactions and/or any known or later developed non-public health information. However, it will be apparent that the non-public information may also include lifestyle information such as hobbies, work interests, travel locations, purchases, education, or any known or later developed category of information about a user.

The data structure for storing non-public information 200 may include all, or portions of the information in the data sources 400. In various other exemplary embodiments according to this invention, the non-public information includes information and/or data obtained from pervasive location sensors, heart rate and/or body monitoring sensors, audio and/or video sensors, telephone caller id and call log information from telecommunication device 1030, video viewing information from video viewing device 1010, audio information from audio device 1020, firewall or proxy server logs and/or information from various sensors and/or devices associated with a user.

The various information sources may be combined logically and/or physically into a single data structure for storing non-public information 200. In various exemplary embodiments, feature vectors derived from each source of information are determined and combined into a multi-modal representation of the user.

In still other exemplary embodiments according to this invention, the non-public information encoded within the data structure for storing non-public information storage 200 is optionally synchronized with the smartphone 600; the user's smartcard 800 and/or any known or later developed device. For example, the information contained within an exemplary data structure for storing non-public information 200 is associated with a personal computer, workstation, server and/or gateway optionally synchronized with the user's smartphone 600 and/or the user's smartcard 800. It will be apparent that synchronization may occur between the same or different types of information storage medium capable of storing the information encoded within the data structure for storing non-public information 200. Thus, synchronization may occur between the data structure for storing information 200 encoded on a mobile device, such as a smartphone 600, and the data structure for storing information 200 encoded on a personal computer, a workstation, a home gateway or any other known or later developed device and/or medium for storing the non-public information.

Figure 2:
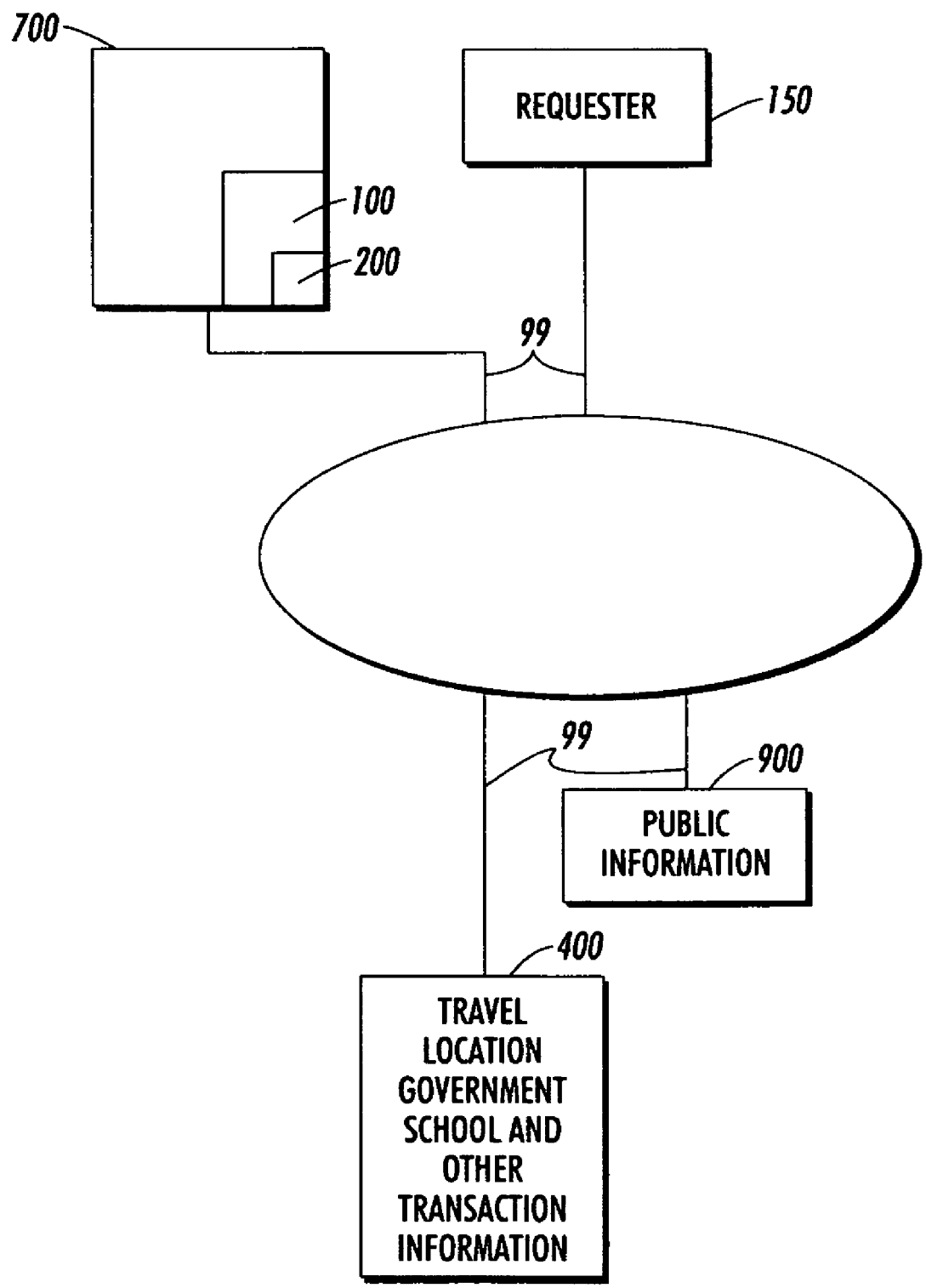
FIG. 2 shows an overview of a second exemplary system for protecting non-public information according to this invention.

FIG. 2 shows an overview of a second exemplary system for protecting non-public information 100 according to this invention. The system for protecting non-public information 100 is embedded within the personal digital assistant (PDA) 700. The system for protecting non-public information 100 contains a data structure for storing non-public information 200. In various exemplary embodiments, the information stored within the non-public information store is, or is derived from, a user transaction data source 400. However, it should be apparent that transactions completed with the personal digital assistant 700, information retrieved from a home gateway (not shown) over communications link 99 or any other non-public information source may also be used in the practice of this invention.

A requestor 150 initiates a request for non-public information from the system for protecting non-public information 100 embedded in personal digital assistant 700. The system for protecting non-public information receives the request and optionally displays a privacy impact indicator to the user based on the privacy consequences of releasing the information. Privacy consequences may be measured based on a comparison to the user's privacy policy, the public information 900 and the like. Optional threshold release criteria previously specified by the user allow transactions compatible with the user's privacy policy and threshold release criteria to be automatically completed.

Figure 3:
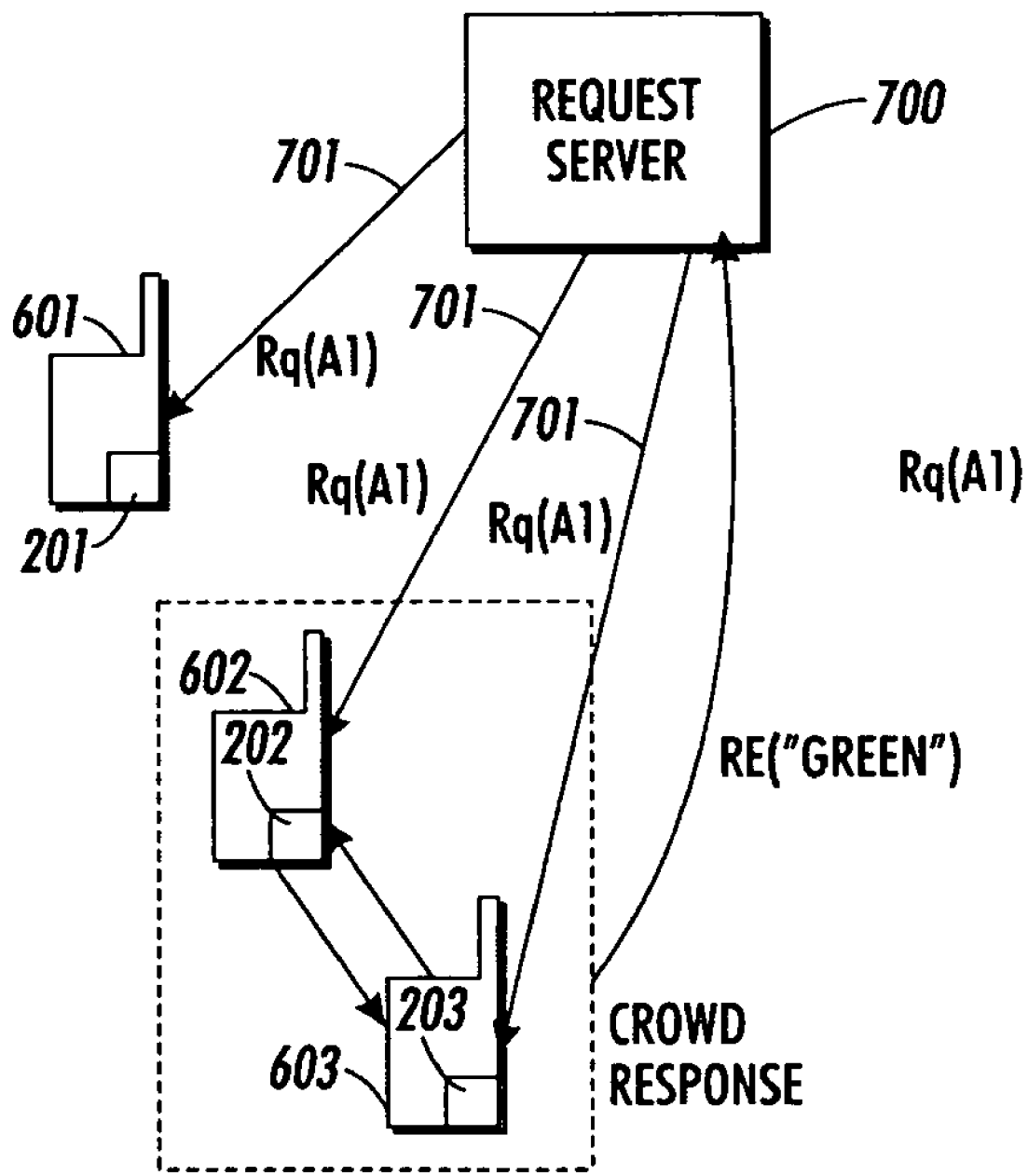
FIG. 3 shows an overview of an exemplary protocol for exchanging non-public information between an external requestor and mobile devices according to this invention.

FIG. 3 shows an overview of an exemplary protocol for exchanging non-public information between an external requestor and mobile devices according to this invention. The first, second and third smartphones 601-603 contain embedded systems for protecting non-public information. Each of the embedded systems for protecting non-public information contain memories. The memories store the respective data structures for storing non-public information 201-203. Information contained within a first data structure for storing non-public information 201, within the first smartphone 601, is synchronized, merged and/or transferred with information contained in a data structure for storing non-public information within a home gateway or server (not shown). It will be apparent that a user's non-public information can be updated from various sources of information. Moreover, the information in the data structure for storing non-public information may be located in a mobile device, a central repository and/or at any other location accessible over communications link 99.

In one exemplary embodiment according to this invention, request server 700 transmits a request for non-public information 701 to the first smartphone 601, the second smartphone 602 and the third smartphone 603. The request for non-public information 701 requests the identification of users associated with attribute $A_1$. In one exemplary embodiment, the attribute $A_1$ specifies the hair color of a specific user. The systems for protecting non-public information (not shown) are embedded within the first, second and third smartphones 601-603 respectively. The systems for protecting non-public information (not shown) determine whether the response to the request complies with the selected privacy policies of the relevant users. That is, the systems for protecting non-public information (not shown) embedded within the first, second and third smartphones 601-603 determine whether the release of the requested information violates the user's privacy policy.

In various exemplary embodiments according to this invention, the second and third embedded systems for protecting non-public information (not shown) use private cryptographic matching protocols. The cryptographic matching protocols identify candidate users and/or build crowds of users willing to share the requested attribute information $A_1$ based on threshold release criteria associated with each user. For example, a user may specify a willingness to share their non-public green hair color attribute information with an external requester, only if at least N other users with the green hair color attribute value also share their information.

The user specifies threshold release criteria based on the value, minimum privacy and/or any known or later determined consideration. The threshold release criteria may include but are not limited to the minimum number of users willing to share the same or similar non-public attribute values. The threshold release criteria are specified in a preference file and/or entered manually. In various exemplary embodiments according to this invention, cryptographic matching protocols are used to determine whether the threshold criteria have been met. For example, cryptographic matching protocols are used to determine the number of users willing to share the information associated with one or more requested attribute values. Since the attribute values are encrypted, the actual attribute values are not revealed unless the threshold release criteria are satisfied.

The threshold release criteria may be previously entered by the user and/or determined dynamically. For example, a first user's privacy policy specifies that hair color information is to be released from crowds of at least 2 users. The privacy policies associated with the second and third users permit the sharing of hair color information from crowds of at least 2 users. Since there are two or more users willing to share the requested attribute information, a crowd of size at least 2 is formed for the green hair color attribute. The crowd of size at least 2 returns the aggregated "GREEN" hair color attribute information to the server 700 using an anonymizing network or the like. In this way, a request for non-public information is satisfied in an aggregate form that also satisfies the constraints imposed by the privacy policy of each user.

In various exemplary embodiments, the request for non-public information is accompanied by an offer of valuable consideration. That is the requestor offers something of value if the user reveals the requested non-public information. For example, the requestor may agree not to store and/or save the requested non-public information, not to transfer the information to a third party and the like. Alternatively, merchandise and/or other valuable consideration is offered in return for access to the user's non-public information. It will be apparent that the exemplary protocol for exchanging anonymized non-public information may be used in any wireless or wired environment, a trusted computing environment, with processor chips embedded into smartcards and/or various other types of computing environments.

Figure 4:
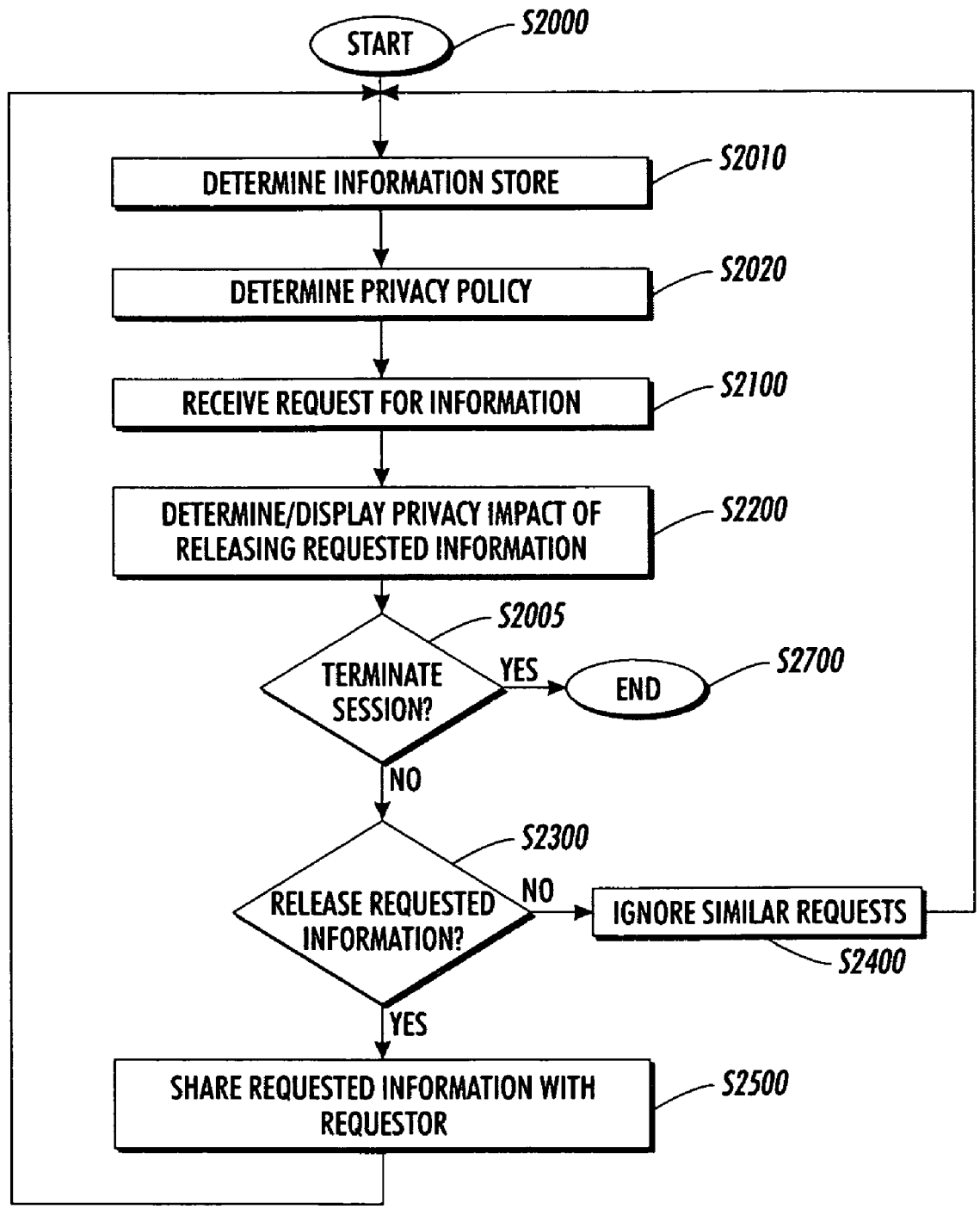
FIG. 4 is a flowchart of a first exemplary method of protecting non-public information according to this invention.

FIG. 4 is a flowchart of a first exemplary method of protecting non-public information according to this invention. The process begins at step S2000 and immediately continues to step S2010.

In step S2010, the non-public information store is determined. The non-public information store is contained within a mobile device, in a central encrypted repository, within the user's gateway, a router, a personal computer or at any other location accessible over a communications medium. In various exemplary embodiments according to this invention, the non-public information store contains identifying information, potentially identifying information, and/or partially identifying non-public information about a user.

For example, in one of the embodiments, a user's green hair color and recent purchase of green pants are associated with the user based on identifying, potentially identifying and/or partially identifying information. In still other embodiments, personal, financial, transaction, medical or other non-public information useful in providing context and/or a profile of the user is also associated with the subject based on the identifying, potentially identifying and/or partially identifying information.

The non-public information store is populated via data mining techniques, explicitly via user surveys and/or questionnaires and/or using any known or later developed method of determining attributes and/or features associated with a user. After the various types of identifying information in the non-public information store have been determined, control continues to step S2020.

In step S2020, an optional privacy policy is determined. The optional privacy policy indicates how much information the user is willing to disclose, under what circumstances and with what restrictions. Thus, in one example, a subject's default or null privacy policy indicates an unwillingness to disclose any information not already in the public domain. However, in another example, a subject specifies a high level of privacy for medical information and a low level of privacy for favorite colors, favorite actors and the like. In other exemplary embodiments according to this invention, a privacy policy is associated with the requestor. The privacy policy of the requestor specifies how the information received from the user is handled. The privacy policy of the requestor is optionally communicated to the user. After the optional privacy policies have been determined, control continues to step S2100.

A request for non-public information is received in step S2100. In various exemplary embodiments, the request for non-public information is a request from a vendor for all or a portion of the information contained in the non-public information store. For example, the request may be a request by a styling salon for the hair color or styling preference of the user. In return for disclosing the non-public styling preference information, the user is optionally offered a coupon, cash or other types of consideration. In various other exemplary embodiments, the user's privacy policy specifies the minimum size of the group or the crowd size parameters to be satisfied before the requested attribute values are released. After the request for non-public information has been received, control continues to step S2200.

In step S2200, a privacy impact indicator is determined based on the query, the user's privacy policy, and optionally the requestor's privacy policy and the publicly available information. The privacy impact indicator is based on audio, visual, tactile, olfactory or any other human sense. For example, a privacy impact indicator may visually indicate the effect of disclosing the requested information using a user interface element such as a thermometer, a dial, a meter and the like. In other exemplary embodiments, audio-indicators such as sounds of varying frequencies, duration, beat, tactile indicators and the like are used alone or in combination. Control then continues to step S2250.

In step S2250, a determination is made as to whether the user has requested termination of the current session. The sessions may be automatically managed and terminated under program control. However, a user may also request termination of the current session using a key sequence, a voice command or the like. If it is determined that termination of the session has been requested, control continues to step S2700 and the process ends. Otherwise, control continues to step S2300.

In step S2300, a determination is made whether the user will release the requested non-public information. For example, in various embodiments according to this invention, a pop-up window displayed on a personal digital assistant requests the user's permission to release the requested non-public information. The release prompt is accompanied by a privacy impact indicator. In some of the exemplary embodiments, the privacy impact indicator is a visual warning indicator such as a cautionary sign, yield symbol, a stop signal or the like. The privacy impact indicator may be displayed to the user on the display of a personal digital assistant, a smartphone or any other appropriate display device. The subject's response to the request for information is facilitated by the privacy impact indicator. The information is optionally anonymised and/or otherwise transformed before being released.

For example, the disclosure of seemingly innocuous non-public information may significantly affect the amount of public information already available about the user. In this case, a red traffic light is displayed as the privacy impact indicator to indicate a privacy risk to the user. Conversely a green traffic light may be used if the release of the requested information would not significantly add to the public information already available. However, it should be apparent that any color and/or various other types of user interface elements may be used without departing from the scope of this invention.

If it is determined that the user does not want to release the requested non-public information, control continues to optional step S2400 where a flag is optionally set to ignore similar requests for information for a determined period. Control then proceeds immediately to step S2010. Steps S2010-S2300 are then repeated until it is determined in step S2300 that the requested non-public information should be released; or a determination is made in step S2250 that a session termination request has been received.

In various other exemplary embodiments according to this invention, a user designates a set of threshold release criteria. The threshold release criteria describe acceptable conditions for the disclosure and/or sale of non-public information. The threshold release criteria may specify $3^{rd}$ party transfer rights, minimum crowd sizes to be satisfied before non-public information is released or the like. The privacy impact of the threshold release criteria are optionally indicated to the user by a privacy impact indicator, such as a privacy meter or the like. Requests for information compatible and/or matching with the user's threshold release criteria are automatically satisfied. This allows the user to continue transactions with fewer interruptions. If it is determined in step S2300 that the requested non-public information should be released, control continues to step S2500.

In step S2500 the requested non-public information is shared with the requestor. For example, a request for the user's hair color is selectively revealed if a sufficient number of other users with green hair are willing to respond and/or the selected privacy policy permits disclosure of the non-public information. After the requested non-public information has been shared with the requestor, control immediately continues to step S2010. Steps S2010-S2500 repeat until a determination is made in step S2250 that a session termination request has been received. Control then continues to step S2700 ad the process ends. The sessions may be managed manually or automatically. Thus, users may directly request the termination of sessions. However, sessions may also be started and terminated under programmatic control to eliminate the need to manage sessions directly.

Figure 5:
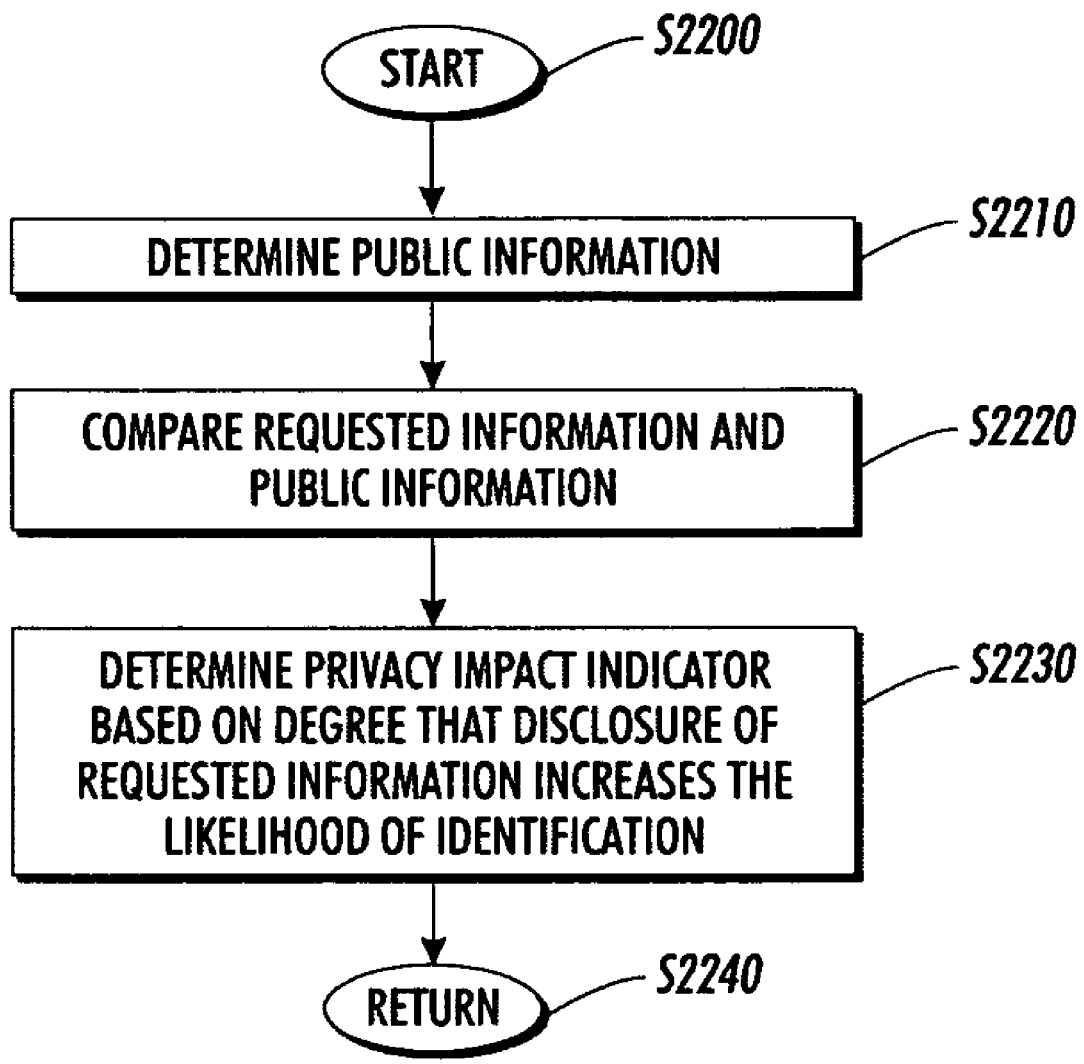
FIG. 5 is a flowchart of an exemplary method of determining a privacy impact indicator according to this invention.

FIG. 5 is a flowchart of an exemplary method of determining a privacy impact indicator according to this invention. The process begins at step S2200 and immediately continues to step S2210. In step S2210, public information about the user is determined. Public information is information already released; widely known; and easily obtained. The public information is retrieved from a central repository, composed from various data sources such as credit agencies and/or created using any known or later developed method. After the public information about the user is determined, control continues to step S2220.

In step S2220 the requested information and the public information are compared to determine a degree of disclosure. Thus, in one exemplary embodiment according to this invention, if the requested information is already available as public information, the degree of disclosure is low. If the requested information is not available as public information, the degree of disclosure is high. For example, if the requested information is hair color and zipcode, satisfying the request would reveal that the user's hair color is "green" and the user's zipcode is "94105". If the requested information can be combined with publicly available information to reveal the user's identity then the degree of disclosure is high. After the degree of disclosure has been determined, control continues to step S2230.

In step S2230, a privacy impact indicator is determined based on the degree of disclosure. The privacy impact indicator is based on visual, audio, tactile, olfactory, taste or any other known or later developed human sense. The privacy impact indicator is then displayed to the user. Exemplary visual privacy impact indicators may be dials, thermometers, bar graphs or any visual user interface element useful in indicating a range. However, it will be apparent that audio, tactile, olfactory or other types of human sensible privacy impact indicators may also be used without departing from the scope of this invention. After the privacy impact indicator is determined, control continues to step S2240 and immediately continues to step S2300 of FIG. 4.

Figure 6:
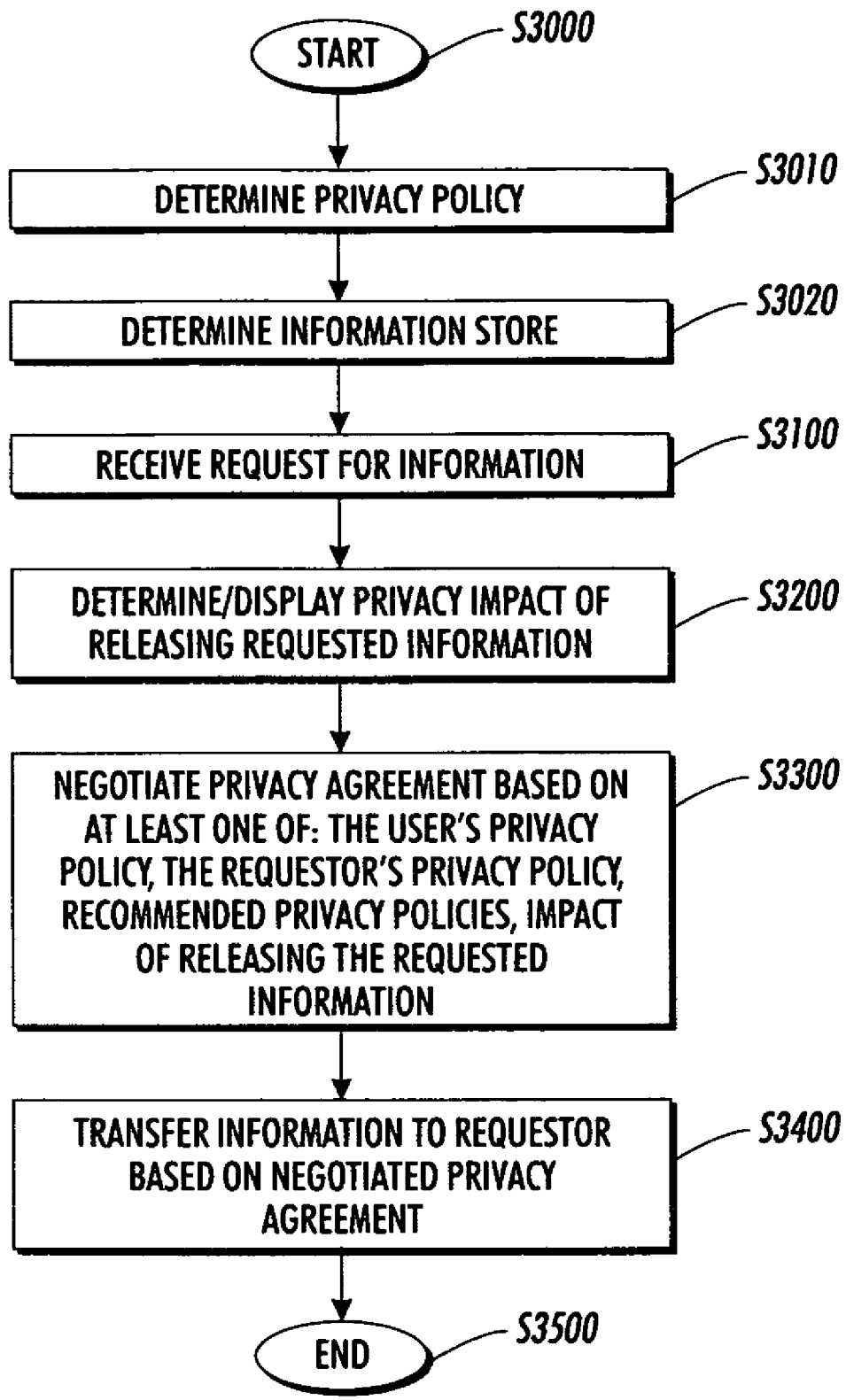
FIG. 6 is a flowchart of a second exemplary method of protecting non-public information according to this invention.

FIG. 6 is a flowchart of a second exemplary method of protecting non-public information according to this invention. The process begins at step S3000 and immediately continues to step S3010 where a user privacy policy is determined. Control then continues to step S3020, where the non-public information store associated with the user is determined.

The non-public information store contains non-public information about a user. The non-public information includes, but is not limited to buying preferences, health and/or lifestyle information, financial information and/or any other type of non-public information about a user. It will be apparent that in various other exemplary embodiments according to this invention, the non-public information store is contained on a single physical or logical device and/or may be split between multiple physical or logical devices without departing from the scope of this invention. After the non-public information store has been determined, control continues to step S3100.

In step S3100 a request for non-public information is determined. The request may be for all, or a part of the information contained in the non-public information store. The request for information may be for computed, intrinsic or other non-public information about a user. In one exemplary embodiment, the request for non-public information includes a request for the user's favorite ice cream flavor mined from grocery sales transactions, a "frequent shopper" reward program, a response to a survey based on direct input from a user. However, it will be apparent that any known or later developed repository or source of information about the user may also be used as a source of non-public information about a user. After the request for non-public information is received, control continues to step S3200 where the privacy impact indicator is determined.

The privacy impact indicator is determined based on the impact of releasing the requested non-public information. For example, if the user's full name is requested, the privacy impact of releasing the full name information would be high since release of the full name uniquely identifies the user. In contrast, the privacy impact indicator of a request for the release of the user's city and state of residence is low, if the requested non-public information is disclosed in aggregate form with a sufficient number of other users who share the same city and state residence values. However, depending on context, disclosure of out-of-country, or out-of-state, city information may have a high privacy impact, if the information can be easily combined with other public information to re-identify the user. Thus, in still other exemplary embodiments, the privacy impact indicator is determined based on the requested non-public information, the public information and an optional context of the request. After the privacy impact indicator is determined, control continues to step S3300.

A privacy agreement is negotiated in step S3300. In one of the various exemplary embodiments, the negotiated privacy agreement is based on at least one of: a privacy policy associated with the user; a privacy policy associated with the requestor; a recommended privacy policy and the impact of releasing the requested information. In various exemplary embodiments according to this invention, the privacy agreement specifically identifies information to be disclosed; consideration to be provided; duration of the privacy agreement; amount and/or type of information; further uses of the information such as $3^{rd}$ party sales and distribution rights, to whom the information may be revealed and/or any term and/or condition relevant to a privacy agreement.

For example, in one exemplary embodiment, the user specifies acceptable privacy policy threshold release criteria describing acceptable conditions for the disclosure and/or sale of non-public information. Proposed privacy agreements that satisfy the user's specified privacy policy threshold release criteria are automatically accepted. Manual user acceptance is optionally required for proposed agreements outside the scope of the threshold release criteria. However, it will be apparent that any combination of manual and/or automatic acceptance of proposed agreements may be used without departing from the scope of this invention. After the privacy agreement has been determined, control continues to step S3400.

In step S3400, non-public information is transferred to the requestor based on the negotiated privacy agreement. If the user does not agree, either manually or automatically, to the requestor's set of acceptable parameters for the privacy agreement, a default, null or no transfer privacy agreement is created. The default, null, or no transfer privacy agreement prohibits the transfer of any non-public information. After the privacy agreement has been determined, control continues to step S3500 and the process ends.

Figure 7:
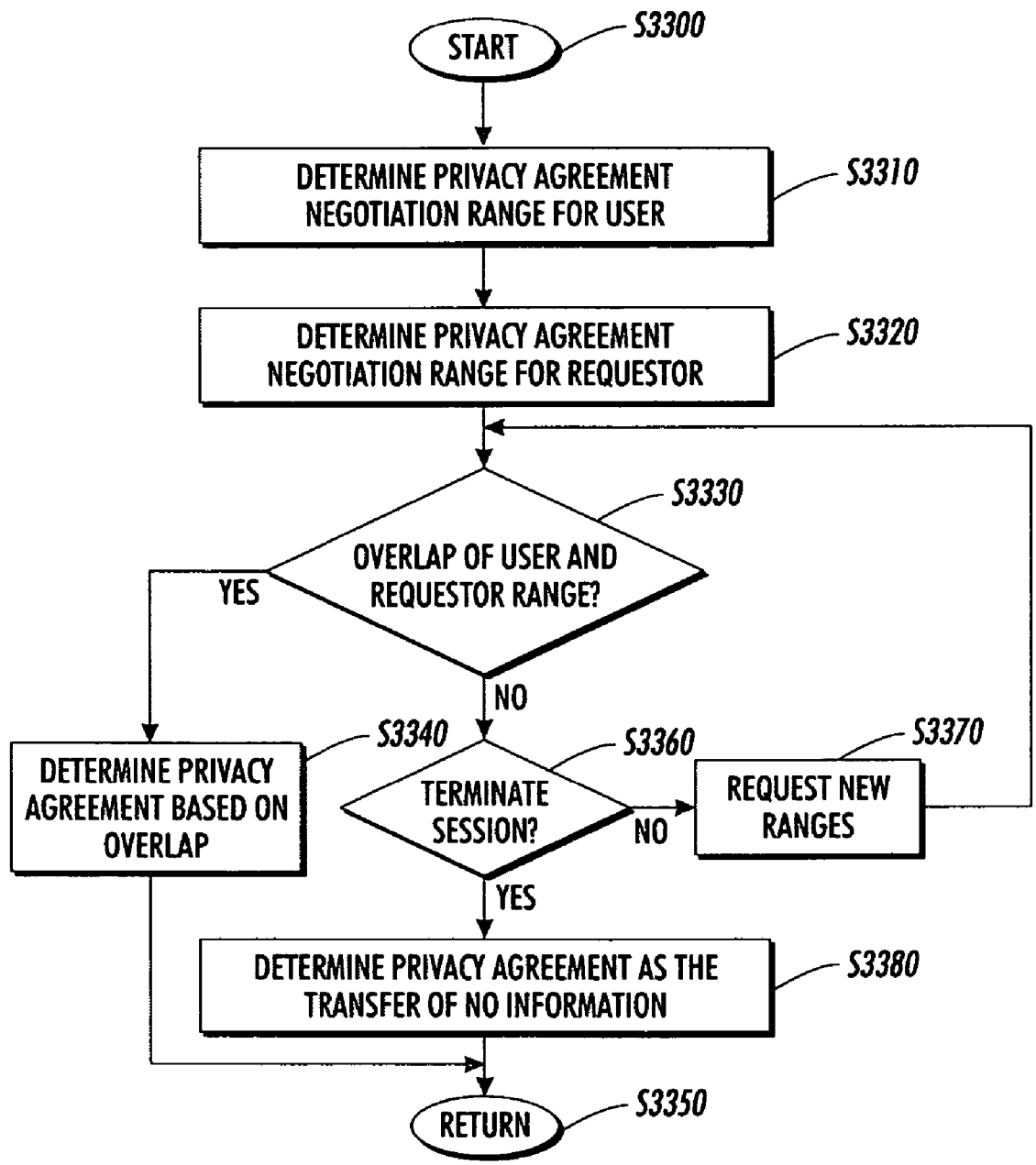
FIG. 7 is a flowchart of an exemplary method for determining a privacy agreement according to this invention.

FIG. 7 is a flowchart of an exemplary method for determining a privacy agreement according to this invention. The process begins at step S3300 and immediately continues to step S3310. In step S3310, a privacy agreement negotiation range for the user is determined. The privacy agreement negotiation range may be associated with one or more of the values in the user's non-public information store. That is, any or none of the values in the non-public information store may be associated with parameters that indicate conditions under which the non-public information values are released. For example, a hair color/green attribute/value pair may be associated with a crowd size of size "4". The crowd size threshold release criteria parameter is the number of users that must agree to release the same non-public information, before the user is willing to release their own information. In various embodiments, the threshold release criteria are specified using formulae, variables and the like. After the user's privacy agreement negotiation range has been determined, control continues to step S3320.

In step S3320, the requestor's privacy agreement negotiation range is determined. In one exemplary embodiment, the requestor specifies a range of consideration for increasingly specific user information. This increases the likelihood that one or more users will provide the requested non-public information. After the requestor's negotiation range has been determined, control continues to step S3330.

In step S3330, a determination is made as to whether the negotiation range of the user and the negotiation range of the requestor overlap, that is, if the range of negotiation values calculated overlap at any point. If the range of negotiation values overlap, control continues to step S3340 where a privacy agreement is determined based on the overlap. In various other exemplary embodiments according to this invention, a measure of compatibility between the privacy policy of the requestor and the privacy policy of a user is determined. For example, in one exemplary embodiment, a measure of compatibility is used to compare Boolean, numerical or literal privacy values. However, it should be apparent that a measure of compatibility may be determined between one or more privacy values of any known or later developed type, without departing from the scope of this invention. After any overlap has been determined, control continues to step S3350 and immediately continues to step S3400 of FIG. 6.

Otherwise, if it is determined in step S3330 that the negotiation ranges do not overlap, control continues from step S3330 to step S3360. In step S3360 a determination is made as to whether the negotiation session has been aborted or terminated. For example, if the pre-defined negotiation ranges of the user and the requestor do not overlap, the negotiation session is optionally aborted and the requestor and user enter into an optional manual re-negotiation session.

In various other exemplary embodiments according to this invention, the user indicates a preference not to be notified of un-successful negotiation sessions. The un-successful negotiation sessions are optionally logged and saved for later review or may be ignored by the user. Alternately, the negotiation session may terminate when a device is turned off, a time limit is exceeded and/or may terminate based on any other condition or event.

If the negotiation session is terminated, control continues to step S3380 where a privacy agreement is set that provides for the exchange or transfer of no information. Control then continues to step S3350 and immediately continues to step S3400 of FIG. 6.

If no negotiation session termination request is received, control continues to step S3370. In step S3370 a new range of negotiation values is requested from the user and/or the requestor. Control then jumps to step S3330. Steps S3330-S3370 are repeated until a privacy agreement is reached or the negotiation session is terminated. It will be apparent that the privacy agreement negotiation can be completed in one round or in multiple rounds without departing from the scope of this invention.

Figure 8:
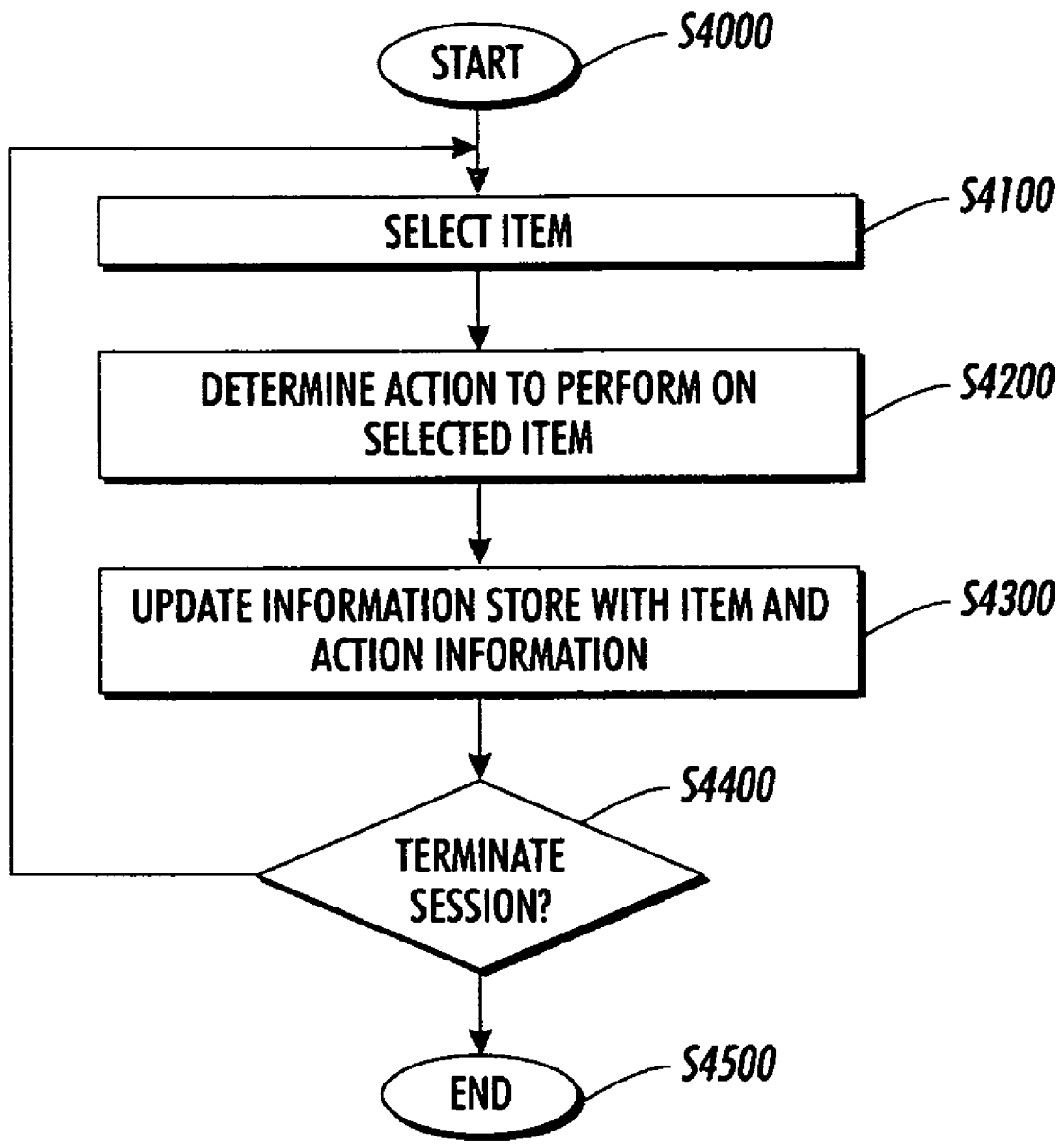
FIG. 8 is a first exemplary method of updating a non-public information store according to this invention.

FIG. 8 is a first exemplary method of updating a non-public information store according to this invention. The process begins at step S4000 and immediately continues to step S4100.

In step S4100 an item is selected. The item may be a digital property such as a movie, music, an e-text or audio book, grocery items or any other item offered for sale or use. Once the item has been selected, control continues to step S4200.

In step S4200, the selected item is acted upon. For example, the item may be purchased, leased, rented; viewed or listened to and the like. After the selected item has been acted upon, control continues to step S4300.

In step S4300, the user's information store is updated with transaction information about the item. Thus, in various exemplary embodiments according to this invention, movie purchase activity is recorded separately from movie rental activity. For example, a purchased item may be a gift, while the viewed item is more likely to reflect specific personal attributes of the user. The non-public information store is updated manually and/or automatically. That is, the user may manually update the non-public information store as transactions occur or an automatic update of the non-public information store occurs based on electronic receipts (e-receipts) electronic bills (e-bill), entries in a PDA TO-DO list, entries in a digital calendar, email messages or any other known or later developed source of non-public information. After the non-public information store has been updated, control continues to step S4400.

In step S4400, a determination is made as to whether the update session has been terminated. In various exemplary embodiments, the update sessions may be created and terminated automatically or manually by the user. If no request to terminate the update session is determined in step S4400, control immediately jumps to step S4100. Steps S4100-S4400 are then repeated until it is determined that an update termination request has been received. Control then continues to step S4500 and the process ends.

Figure 9:
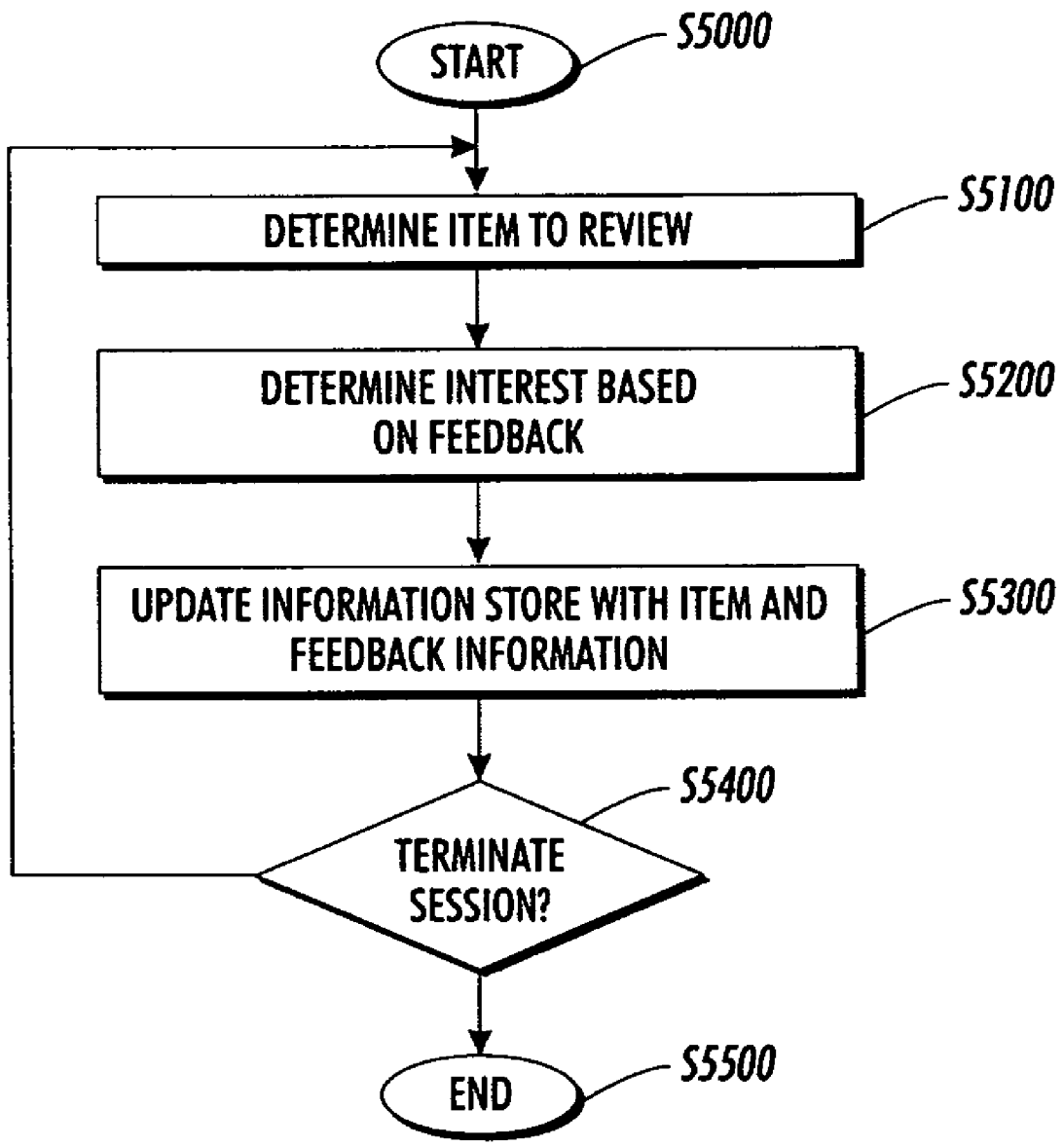
FIG. 9 is second exemplary method of updating a non-public information store according to this invention.

FIG. 9 is a second exemplary method of updating a non-public information store according to this invention. The process begins at step S5000 and immediately continues to step S5100.

In step S5100, the item to review is determined or selected. For example, the item may be an encrypted digital property such as a movie, music, an audio book, a text and the like. However, it should be apparent that any type of property asset or item for which feedback is to be determined may also be used without departing from the scope of this invention. Control then continues to step S5200.

In step S5200, the user's interest in the item is determined. User interest may be based on positive or negative feedback, duration, posture or attitude, feedback surveys or any other known or later developed method of determining user feedback about the item. After the user's interest or feedback information has been determined, control continues to step S5300.

In step S5300, the information store is updated with the user interest or feedback information. For example, if viewing of the romantic-comedy is aborted after 10 minutes, the implied user interest in the romantic-comedy genre may be reduced. In contrast, if a user has explicitly indicated interest in the romantic-comedy genre, the abort feedback information may be used to impliedly reduce the user's expressed interest in one or more of the actors and/or directors associated with the aborted movie. In this way, the user model encoded within the non-public information store can be further refined based on user feedback. After the non-public information store has been updated, control continues to step S5400.

In step S5400, a determination is made whether a request to terminate the session for updating the information store has been received. The session may be terminated automatically by the system or manually by the user. If termination of the update session has not been requested, control continues to step S5100. Steps S5100-S5400 repeat until it is determined in step S5400 that a termination request has been received. Control then continues to step S5500 and the process ends.

Figure 10:
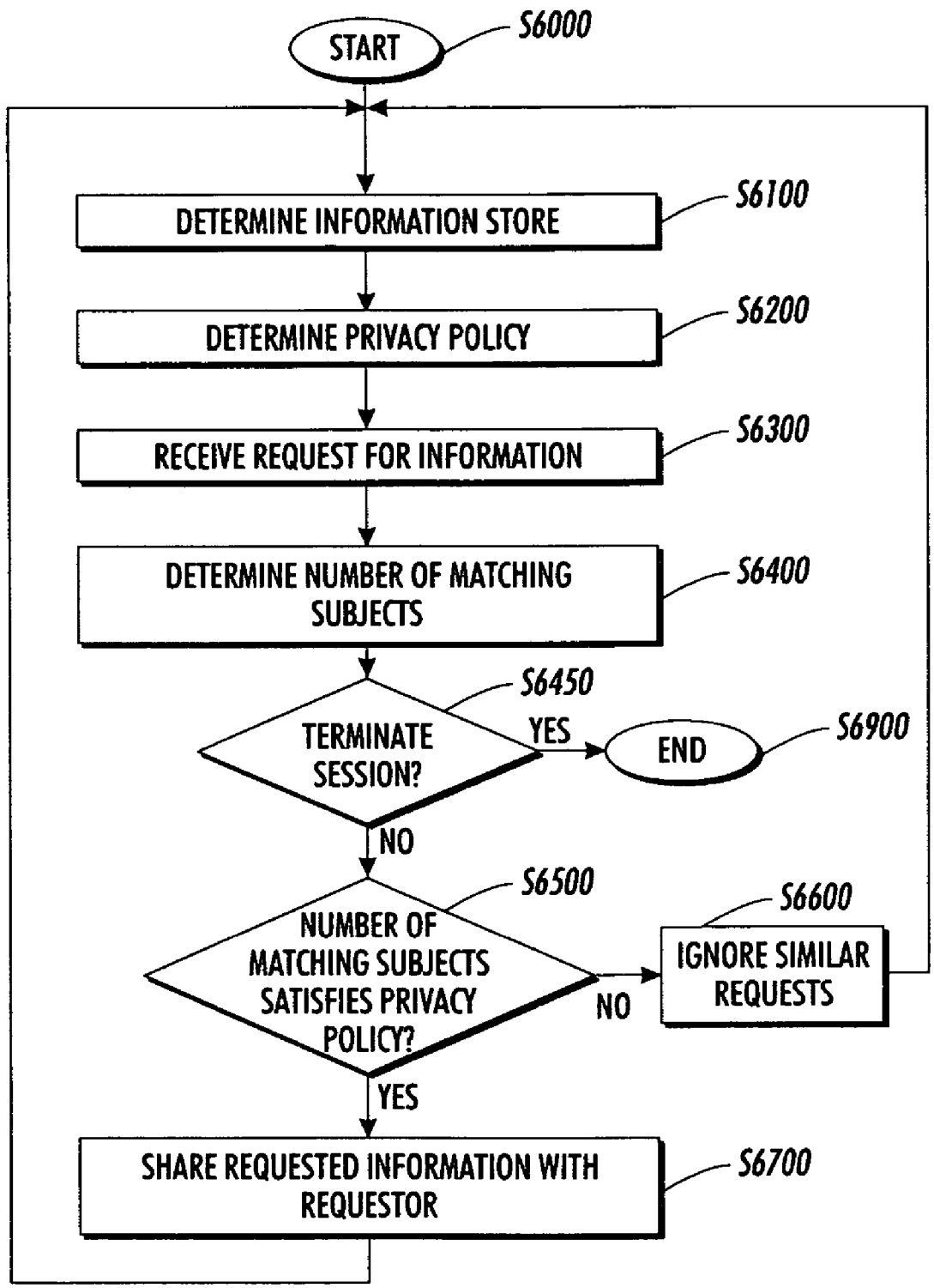
FIG. 10 is a flowchart of a third exemplary method of protecting non-public information according to this invention.

FIG. 10 is a third exemplary method of protecting non-public information according to this invention. The process begins at step S6000 and immediately continues to step S6100 where the user's non-public information store is determined.

The non-public information store is contained within a mobile device, in a central encrypted repository, within the user's gateway, a router, a personal computer or at any other location accessible over a communications medium. For example, in various exemplary embodiments, the non-public information is stored within a home gateway. The home gateway facilitates access to ubiquitous computing and sensor devices in the user's home environment. When the user leaves the home environment, the non-public information store is synchronized and/or transferred to the user's mobile smartphone, personal digital assistant, smartcard and/or any other known or later developed device capable of holding a copy and/or mediating access to the non-public information store. In various other exemplary embodiments according to this invention, portions of the non-public information store are located on different logical and/or physical devices, without departing from the scope of this invention. After the user's non-public information store has been determined, control continues to step S6200.

In step S6200, the user's privacy policy is determined. The privacy policy may be previously set by the user and read from a file, entered dynamically by keyboard, voice and/or retrieved from any other source. After the user's privacy policy has been determined, control then continues to step S6300.

In step S6300, a request for information is received. The request may be for all or a portion of the information associated with the user. For example, a styling salon near the user's current location may request the user's hair color. However, many users are reluctant to release such information if it can be used to identify or partially identify them. Control therefore continues to step S6400 where the number of users willing to reveal the same value for one or more attributes (or set of attributes) is determined. That is, the users matching the desired attribute are determined. The users may be determined using cryptographic matching protocols, trusted $3^{rd}$ party matching service or using any known or later developed matching method. After the number of matching users has been determined, control continues to step S6450.

In step S6450, a determination is made whether termination of the session has been requested. If it is determined that termination of the session has been requested, control jumps immediately to step S6900 and the process ends. Otherwise, control immediately continues to step S6500.

In step S6500, the number of matching users is compared with the privacy policy. In various embodiments, the privacy policy may specify a number of other users required to form a crowd from which the requested information can be disclosed in aggregate form. Thus, in various embodiments according to this invention, the privacy policy may also specify the minimum crowd size necessary for various aggregate disclosures of the requested information.

If it is determined in S6500 that the crowd does not contain the required number of users specified by the privacy policy, then control continues to optional step S6600. In optional step S6600 a timer is optionally set to ignore similar requests for a pre-determined period of time. Control then jumps immediately to step S6100. Steps 6100-S6600 repeat until the privacy policy is satisfied or the session is terminated.

If the privacy policy is satisfied, control continues to step S6700 where requested information is shared with the requester. Control then continues to step S6100. Steps S6100-S6700 repeat until the session is terminated. It will be apparent that sessions may be created and/or terminated manually or automatically without departing from the scope of this invention.

FIG. 11 is an exemplary survey for gathering non-public personal information about a user. The survey includes information about a user's date of birth, sex, city and state address, recreational interests, undergraduate school, graduate schools and work interests. The user is prompted to enter the information which is then stored in the non-public information store. A requestor's access to portions of the information in aggregate and/or to any extracted knowledge is conditioned on the user's response to the requestor's offers of consideration, privacy impact, the user's privacy policy and the like. For example, the requestor may offer coupons, merchandise, money and the like for information of varying levels of specificity. In various other exemplary embodiments, information requests are analyzed to determine the degree to which the requested non-public information identifies the user.

A privacy impact indicator is then determined to communicate how the user's privacy is affected by the release of the non-public information. The exemplary survey 1100 is one of various methods for adding information to the non-public information store. However, it will be apparent that the non-public information store may be updated with information from the user's environment, ubiquitous sensors, personal transaction information, utility providers and/or any other known or later developed source of information about the user.

Figure 12:
FIG. 12 is an exemplary data structure for storing source information according to this invention.

FIG. 12 is an exemplary data structure for storing source information 1200. The exemplary data structure for storing source information 1200 contains an identifier portion 1210 and location portion 1220. The identifier portion 1210 includes an identifier that identifies the data source within the system for protecting non-public information. The location portion 1220 specifies the location of each data source for a user. In various exemplary embodiments according to this invention, the source information data structure 1200 is located on the user's mobile device, a home gateway, a personal computer, a workstation or server or at any location accessible over a communications link or network.

The data sources referenced in the data structure for storing source information 1200 are available from a local file, from a web server, a file transfer protocol server and/or from any known or later developed information repository accessible over a communications link.

The rows of the exemplary data structure for storing source information 1200 are comprised of data source identifier portions 1210 and data source location portions 1220. The data source location portions 1220 are in turn optionally comprised of sub-portions specifying protocol or type, location, user identifier and password information required to access the specified data source.

The first row of the exemplary data structure for storing source information contains the values "1", and "[OUTLOOK: "C:\Documents and Settings\User_2\Local Settings\Application Data\Microsoft\Outlook\Outlook.pst": USERID.OUTLOOK:PASSWORD.OUTLOOK]". This indicates that data source "1" is associated with an Outlook pst file. The required userid and password for the exemplary outlook file are encoded within the PASSWORD.OUTLOOK and USERID.OUTLOOK data structures respectively.

The "Outlook.pst" data file adds email, calendar, contact and note information as well as archived and/or purged information to the information store. For example, social relationships between users can be determined based on overlapping family and/or business calendar entries. In still other exemplary embodiments according to this invention, sent mail information, POP3, IMAP mail folders, Exchange folders or any other known or later developed source of information associated with a user may also be added to the information store.

The second row of the exemplary data structure for storing source information 1200 contains the value "2" in the identifier portion 1210, and the value "[NETBOOKS:http://www.netbooks.com:USERID.NETBOOKS:PASSWORD.NETBOOKS]" in the location portion 1220. These values indicate that data source "2" is associated with a "NETBOOKS" library record. The "NETBOOKS:" portion of the location portion 1220 optionally indicates the protocol for accessing the NETBOOKS digital library record. The "http://www.netbooks.com" portion specifies the location from which the library record is retrieved. The required userid and password portions indicate that the userid and password for the NETBOOKS library record are encoded within the specified "USERID.NETBOOKS" and "PASSWORD.NETBOOKS" data structures.

The third row of the exemplary data structure for storing source information 1200 contains the values "3", and "[DIGITAL_LIBRARY:CITESEER:FNAME:ALBERT:LNAME: PICARD]". This indicates that data source "3" is associated with a "CITESEER" citation record and the protocol used for accessing the record is a "DIGITAL_LIBRARY" protocol. The citation record for the author "ALBERT PICARD" is retrieved and automatically associated with the user. Thus, the works of the author "ALBERT PICARD" are automatically retrieved and associated with the user's information store. Moreover, since the data source is a subscription, as new works are published, the citation record and the user's information store are automatically updated.

The fourth row of the exemplary data structure for storing source information 1200 contains the value "4" in the identifier portion 1210 and the value "DIGITAL_LIBRARY:NETFLIX:USERID.NETFLIX:PASSWORD.NETFLIX" in the location portion 1220. This indicates that the fourth entry of the information source data structure contains a "NETFLIX" digital library record accessible via a "DIGITAL_LIBRARY" protocol. As discussed above, the required USERID and PASSWORD data structures contain the userid and password information for access to the "NETFLIX" information. The "NETFLIX" record is updated with new information as the user reviews and sometimes rates the movies. This information is then retrieved and made available as an additional entry in the information store. In various other exemplary embodiments according to this invention, usage information from BLOCKBUSTER, and/or any other type of digital library may also be used without departing from the scope of this invention.

The fifth row of the exemplary data structure for storing source information 1200 contains the value "5" in the identifier portion 1210 and the value "[DIGITAL_LIBRARY: AMAZON::USERID.AMAZON:PASSWORD.AMAZON]" This indicates that the fifth data source is associated with the "AMAZON" digital library record accessible using the "USERID.AMAZON" and "PASSWORD.AMAZON" data structures. The data source is optionally updated each time the user purchases a new book or other item through "AMAZON" and the new information is automatically made available within the information store.

The sixth row of the exemplary data structure for storing source information 1200 contains the value "6" in the identifier portion 1210 and the value "[IEEXPLORER:ARCHIVE]" This indicates that the sixth data source is associated with the user's "INTERNET EXPLORER" archive of web sites visited. There are no userid and password data structures associated with the entry since the file is local. However, in various other exemplary embodiments the archive files are associated with userids and passwords for security and privacy in multi-user environments and the like. The "IEEXPLORER:ARCHIVE" data source is updated from the user's archived web usage file to reflect the web sites visited during a specific period of time. Over time these sites can be used to develop a model of the user's interests useful in suggesting new books and products likely to interest the user.

The seventh row of the exemplary data structure for storing source information 1200 contains the value "7" in the identifier portion 1210 and the value "[E_BILL:SBC:USERID.SBC:PASSWORD.SBC]" This indicates that the seventh data source is associated with the user's "SBC" Telephone bill. The "[E_BILL:SBC:USERID.SBC:PASSWORD.SBC]" data source is updated from the user's telephone record usage records and can be used to improve models of the user's social and business interaction and networking. The "USERID.SBC" and "PASSWORD.SBC" data structures store the userid and password required to gain access to the electronic billing information for the user.

The eighth row of the exemplary data structure for storing source information 1200 contains the value "8" in the identifier portion 1210 and the value "[BANK:WELLSFARGO: USERID.WELLSFARGO:PASSWORD.WELLSFARGO] ". This indicates that the eighth data source is associated with the user's "Wells Fargo" Bank Statement. The "[BANK: WELLSFARGO:USERID.WELLSFARGO:PASSWORD.WELLSFARGO]" data source is updated from the user's bank records. The anonymized financial information is then used to improve models of typical financial behavior and to develop new financial products and services that best address user needs. The "USERID.WELLSFARGO" and "PASSWORD.WELLSFARGO" data structures store the userid and password required to gain access to the user's electronic banking information.

The $N^{th}$ row of the exemplary data structure for storing source information 1200 contains the value "N" in the identifier portion 1210 and the value "[LOCATOR:CINGULAR: USERID.CINGULAR:PASSWORD.CINGULAR]". This string indicates that the $N^{th}$ data source is associated with a Location Based Service provided by Cingular Corporation. The string "[LOCATOR:CINGULAR:USERID.CINGULAR:PASSWORD.CINGULAR]" data source is updated from the user's geo-location information maintained by the cellular phone service provider. The information may be from a GPS device in the phone, cell tower triangulation or any other known or later developed method of determining the location of the user. The anonymized or partially anonymized location information is made available to user authorized services or applications to facilitate the development and deployment of ubiquitous computing. It will be apparent that in various other exemplary embodiments according to this invention, the data source data structure may be an array, a linked list, a relational data base record or any other known or later developed data structure useful in referencing data sources.

FIG. 13 is an exemplary data structure for storing advertising asset information 1300 according to this invention. An advertising asset is a digital property that is displayed when one or more constraints associated with the digital property are satisfied. The exemplary data structure for storing advertising asset information 1300 is comprised of attribute1-attribute4 portions 1310-1340 and an advertising display portion 1350. However, it will be apparent that any number of attribute values may be associated with a digital property without departing from the scope of this invention.

The advertising asset 1350 is retrieved and displayed when the constraint values associated with attribute1-attribute4 portions 1310-1340 are matched or satisfied. The attribute1-attribute4 portions 1310-1340 may contain wildcard values, under and/or fully specified pattern values, formulae and/or any known or later developed method of representing patterns. The exemplary advertising asset data structure 1300 is located on a system maintained by a requester, a user's mobile device, personal computer, workstation, gateway or server or at any other accessible location.

The exemplary data structure for storing advertising asset information contains values for attribute1-attribute4 portions 1310-1340 that are matched against information in the user's non-public information store. The attribute1-attribute4 portions 1310-1340 are used to specify a target user's location, interest, education background or other attribute and/or feature associated with the user. Depending on the privacy policy specified by the user, minimum crowd sizes may be required to form before the non-public information is released in aggregate form. Once the specified constraints or values for attribute 1-attributed portions 1310-1340, are matched for the requisite number of users, the advertising display information is displayed at the location specified by the location attribute.

For example, an advertiser may solicit the formation of crowds of users interested in books in the "MYSTERY" and "ROMANCE" genres who are located close to a particular bookseller or chain of bookseller locations. Once the crowd has been formed, a digital property such as an audio or video advertisement is displayed. The video advertisement may be displayed on a video monitor proximate to a store and/or on personal video devices such as multi-media enabled smartphones, personal digital assistants and the like. Similarly audio advertisements may be communicated using personal digital assistants, smartphones, wireless-enabled MP3 players, radios smartphones and/or any known or later developed audio communication device.

The first row of the exemplary data structure for storing advertising asset information 1300 contains value "LOCATION: X=23.5; Y=45.2; Z=1.2" in the attribute1 portion 1310. This indicates the location co-ordinates that a target user must occupy to satisfy the constraint. It will be apparent that the co-ordinates are encoded as longitude, latitude and elevation or using any other known or later developed location co-ordinate system without departing from the scope of this invention.

The attributed portion 1320 of the exemplary data structure for storing advertising asset information 1300 contains the value "SELF.CLOTHING.INSEAM.SIZE=30". This value indicates that the target user's inseam must be a size "30" to satisfy the constraint. This information is useful to vendors seeking to send advertisements about an overstock item in a particular size, color and the like.

The attribute3 portion 1330 of the exemplary data advertising structure 1300 contains the value "SELF.CLOTHING.COLORS={RED|GREEN}" This indicates that any target user should prefer red or green colored clothes. This type of information may also be useful to retailers with overstock items in the indicated colors. The specific value may be determined by mining the user's transactions, analyzing user surveys, automatic or manual RFID scanning of purchased items or by using any known or later developed input method.

The attributed portion 1340 of the exemplary data structure for storing advertising asset information 1300 contains the value "CHILDREN.NUMBER=2". This indicates that the target user must be associated with 2 children to satisfy the constraint. This type of information might be used by vendors hoping to target their advertising at parents having two children.

The advertising display portion 1350 contains the value "FTP:://FTP.ADS.COM/FILE001.MPG". The "FTP" portion of the entry indicates the FTP protocol is used to retrieve the advertising asset. The "FTP.ADS.COM" portion indicates the fully qualified location of the advertising asset. However, it should be apparent that various media can be used to store the advertising assets and various protocols may be used to retrieve the information without departing from the scope of this invention. For example, the hyper-text transfer protocol (HTTP) and/or various other protocols may be used to locate and transfer the "FILE001.MPG" file for display to the target user. The exemplary advertising asset "FILE001.MPG" is encoded as an mpeg file capable of containing audio and/or visual information.

The attribute1-4 portions 1310-1340, reflect constraints that must be matched to activate or retrieve the advertising asset for display and/or presentation to the user. Thus, in one example, the advertising asset "FILE001.MPG" is displayed when a target user is located at the location co-ordinates X=23.5; Y=45.2 and Z=1.2; the user's clothing inseam size is 30; the user has a preference for red and/or green clothes and the target user has two children. In various other exemplary embodiments according to this invention, the attributes1-4 portions 1310-1340 contain values associated with constraints required to trigger the display of an advertising asset are determined based on data mining techniques and the like.

The second row of the exemplary data structure for storing advertising asset information 1300 contains the value "LOCATION:NEARBY FILE001.MPG" in the attribute1 portion 1310. This indicates that the asset referenced in the advertising display portion 1350 is displayed to the user located "NEARBY" the display of "FILE001.mpg". The "NEARBY" location specification allows a match against a zone or area around the display point for the file "FILE001.MPG". This type of location specification is useful for secondary advertisements relating to tie-in marketing of clothing, restaurants or other merchandisers associated with a movie.

The attributed portion 1320 contains the value "SELF.INTEREST.OPERA=HIGH". This indicates that the user must share their high interest in "opera" to satisfy this constraint. The attribute3 portion 1330 contains the value "SELF.NEEDS.CLOTHING.FORMAL=HIGH". This indicates the user has shared their need for formal clothing. Thus, the full set of constraints reflects a set of users that are located "NEARBY" the display of advertising asset "FILE001.MPG". The set of users have all shared a high interest in opera and a need for formal clothing. These constraints are determined by requesting the relevant information from each user's information store. The constraints are used to trigger the display of an exemplary advertising asset for the tuxedo as seen in the cinema movie preview "FILE001.MPG".

The advertising display portion 1350 contains the value "FTP://FTP.ADS.COM/FILE005.MPG". This value refers to the location of a file transfer protocol server "FTP" at the domain "ADS.COM". The file to be retrieved contains the advertising asset for the tuxedo shown in the cinema movie advert.

The third row of the exemplary data structure for storing advertising asset information 1300 contains the values "LOCATION:NEAR BOOKSELLER_1"; "SELF.INTERESTS.BOOKS.GENRE="HISTORY"; "SELF.INTERESTS.BOOKS.GENRE="ROMANCE"; and "SELF.INTERESTS.BOOKS.GENRE="MYSTERY" in the attribute1-attribute4 portions 1310-1340. These constraint values indicate that the asset referenced in the advertising display portion 1350 is displayed to the user located "NEAR" the variable "BOOKSELLER1" and that target users have indicated an interest in "HISTORY", "MYSTERY" and "ROMANCE" genre books. If these constraints are met, then the instructions in the advertising display portion 1350 are executed to display advertising information to the users. The user book genre information is used to select the candidate books. Mpeg based advertising segments are retrieved using the ftp protocol from the location "ftp.ads.com" based on the ISBN number of the candidate book. A coupon is then generated and displayed on the user's personal digital assistant and/or other device using coupon template coupon01. In rows 1 and 2 of FIG. 13, each of the 4 attributes must be satisfied. However, in the third row, a user must satisfy attribute1 AND either attributed OR attribute3 OR attributed. Thus, the third row demonstrates that the attributes may be combined either conjunctively (AND) or disjunctively (OR) or with any mix of disjunctive and conjunctive combinations in the practice of this invention.

It will be apparent that the advertising assets described above may follow a "push" model, where advertising information is pushed to a user, a pull model where advertising information is pulled by a user, a push/pull model in which advertising information is pushed to users based on threshold acceptance criteria and/or any other combination based on user consent. Moreover, it will be apparent that the above description is merely exemplary. Various other uses of the systems and methods of protecting non-public information may be used to provide transaction context and/or other contextual information without departing from the scope of this invention.

Figure 14:
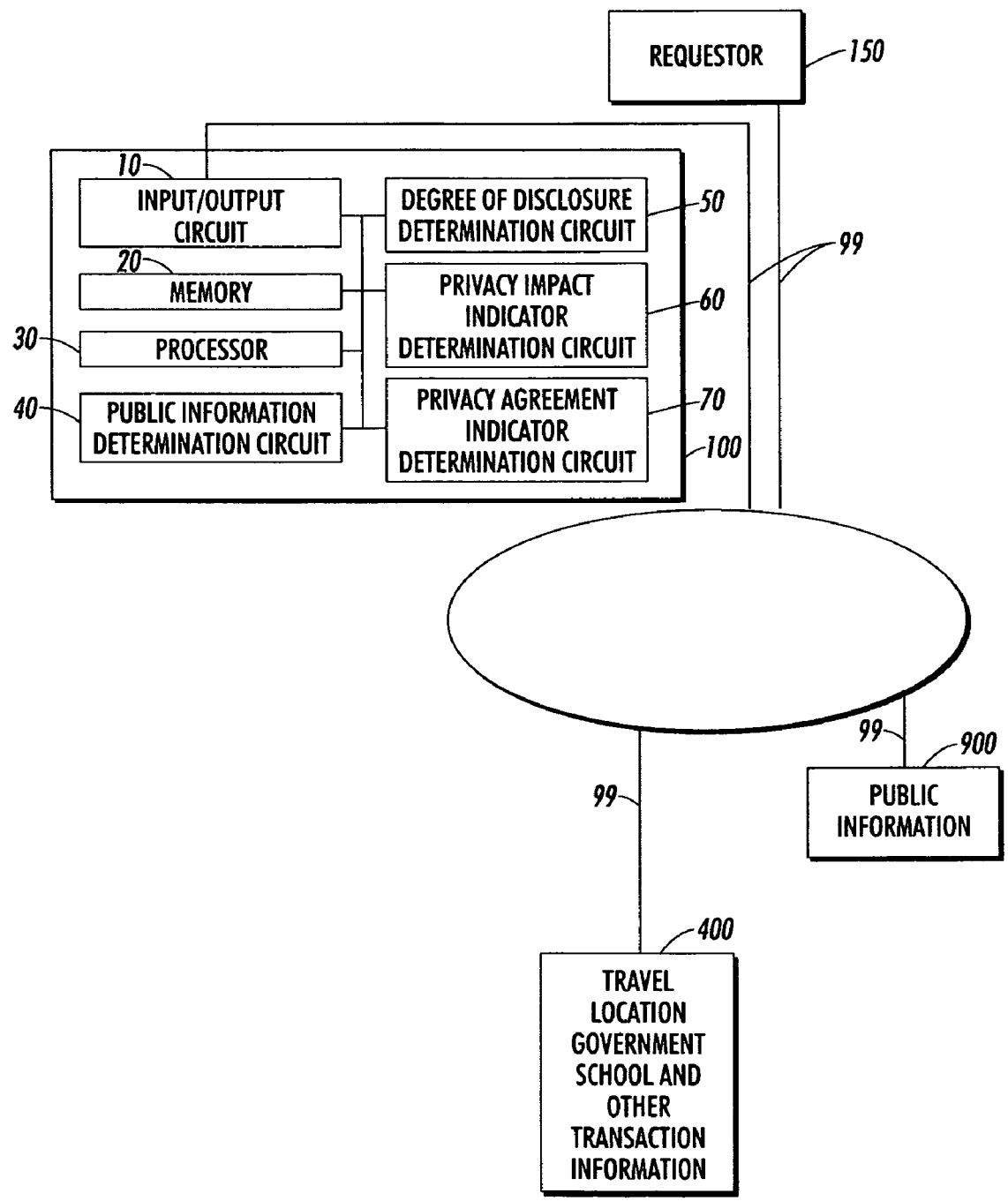
FIG. 14 is an exemplary system for protecting non-public information according to this invention.

FIG. 14 is an exemplary system for protecting non-public information 100 according to this invention. A requestor 150 submits a request for the non-public information associated with a user. In various embodiments, the non-public information is accumulated by the user, accumulated by one or more sensors and/or obtained from any other known or later identified source of user specific information. The non-public information is stored within the memory 20 and/or optional external storage. The request is forwarded over the communications link 99 and received by the input/output circuit 10 of the system for protecting information in a mobile environment 100. The user's non-public information is then retrieved from the memory 20 and/or optional external storage.

The processor activates the public information determination circuit 40. The public information determination circuit retrieves the publicly known and/or publicly available information about the user from the public information repository 900. The publicly known information may be obtained from a single centralized source or may be combined from several sources such as transaction information data source 400.

The processor 30 then activates the degree of disclosure determination circuit 50 to determine the degree of disclosure associated with the request for information. The degree of disclosure determination circuit compares the degree to which the requested information increases the public information about the user. The privacy policy associated with the user is retrieved from the privacy policy information stored in memory 20.

The privacy impact indicator determination circuit 60 is activated to determine the privacy impact of the disclosure based on the degree of disclosure and the user's privacy policy. The privacy impact indicator includes audio, video, olfactory, tactile, taste or any human sensible display characteristic. For example, the privacy impact indicator may be a visual gauge, a thermometer, a dial or any other user interface element. The privacy impact indicator is returned to the user's personal digital assistant and/or other device and displayed. The display of the privacy impact indicator helps the user decide whether releasing the requested non-public information unduly adds to the publicly available information about the user. More generally, the privacy impact indicator helps the user determine whether the release of the information violates the user's privacy policy.

The processor 30 activates the optional privacy agreement determination circuit 70 to determine the constraints associated with any determined agreement. For example, privacy policies associated with the user and/or the requestor are compared. The requestor may optionally provide information about the requestor's privacy policy with the request for information. Compatible user and requestor privacy policies are used to form a privacy agreement that specifies the constraints associated with the disclosure of the requested information. If the constraints of the privacy agreement are met, the requested information is forwarded to the requestor 150 over communications link 99.

Each of the circuits 10-70 of the system for protecting non-public information 100 outlined above can be implemented as portions of a suitably programmed general-purpose computer. Alternatively, the system for protecting non-public information 100 outlined above can be implemented as physically distinct hardware circuits within an ASIC, or using a FPGA, a PDL, a PLA or a PAL, or using discrete logic elements or discrete circuit elements. The particular form each of the circuits 10-70 of the system for protecting non-public information 100 outlined above will take is a design choice and will be obvious and predicable to those skilled in the art.

Moreover, the system for protecting non-public information 100 and/or each of the various circuits discussed above can each be implemented as software routines, managers or objects executing on a programmed general purpose computer, a special purpose computer, a microprocessor or the like. In this case, the system for protecting non-public information 100 and/or each of the various circuits discussed above can each be implemented as one or more routines embedded in the communications network, as a resource residing on a server, or the like. The system for protecting non-public information 100 and the various circuits discussed above can also be implemented by physically incorporating the system for protecting non-public information 100 into software and/or a hardware system, such as the hardware and software systems of a web server or a client device.

The memory 20 in the system for protecting non-public information 100 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIG. 1 can be any known or later developed device or system for connecting a communication device to the system for protecting non-public information 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be a wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. The system for protecting non-public information can be used in banking, medical and/or any other environments to protect a user's non-public information. For example, non-public information may consist of financial or medical records. The system for protecting non-public information mediates the release of this non-public information according to the user's privacy policy. In a banking or medical environment, the privacy policy may specify, for example, that medical data only be released to medical practitioners and financial data is to be release only to the user's bank. It will be clear that other policies are possible. Accordingly, the exemplary embodiments of the invention, as set forth above, are intended to be illustrative, not limiting. Various changes may be made without departing from the spirit and scope of the invention.

What is claimed is:

1. A method of anonymizing information performed by an embedded computer system for protecting private information, the method comprising:

determining a non-public information store for a first entity, wherein the information store contains private data of the entity;

receiving a request for at least one information feature from the non-public information store;

determining a privacy policy for the first entity, wherein the privacy policy specifies a privacy release threshold for the number of entities required to share the requested information;

determining at the embedded computer system a set of other entities willing to share the requested information feature based on privacy policies associated with each entity in the set of entities;

comparing the number of these other entities against the privacy release threshold of the first entity to determine whether the requested information can be released; and determining automatically at the embedded computer system an aggregated response to the request for at least one information feature from the non-public information store based on the set of entities.

2. The method of claim 1, in which the aggregated response is further based on at least one of:

privacy policy for the requestor of information and publicly available information.

3. The method of claim 1, wherein the set of entities willing to share the requested information feature are determined using at least one of: a trusted third party and cryptographic matching protocols.

4. The method of claim 3, wherein the number of entities in the set is based on the privacy policy information.

5. The method of claim 2, wherein the request for at least one information feature from the information store originates from at least one of:

a vendor; a service provider; a family member; and an acquaintance.

6. The method of claim 1, wherein the privacy policy is at least one of: determined by a user and computed.

7. The method of claim 1, wherein the information store is stored in at least one of: a file; a relational database and a data structure.

8. The method of claim 1, wherein the information store is located in at least one of: a mobile device; a personal computer; a workstation; a server; a gateway and a home portal.

9. A method of indicating the effect of disclosing information performed by an embedded computer system for protecting private information, the method comprising:

determining a non-public information store, wherein the information store contains user-input private data;

determining a privacy policy for a first user, wherein the privacy policy specifies a privacy release threshold for the number of users required to share the requested information;

receiving an information request for information in the non-public information store;

determining at the embedded computer system a number of other users willing to share the requested information;

comparing the number of these other users against the user privacy release threshold of the first user to determine whether the requested information can be released; and determining automatically at the embedded computer system a privacy impact indicator based on the effect of disclosing the requested information and the privacy policy.

10. The method of claim 9, in which the privacy impact indicator is further based on at least one of: privacy policy for the requestor of information and publicly available information.

11. The method of claim 9, further comprising the steps of displaying the privacy impact indicator.

12. The method of claim 11, wherein the privacy impact indicator is associated with at least one of: a visual, aural, tactile and olfactory display attribute.

13. The method of claim 12, wherein the visual privacy impact indicator is a user interface component.

14. The method of claim 13, wherein the privacy impact indicator is at least one of: a dial; a gauge; a meter; and a thermometer.

15. The method of claim 12, wherein the aural privacy impact indicator is at least one of: a frequency; a tone; a duration; and a beat.

16. A method of sharing information performed by an embedded computer system for protecting private information, the method comprising:

determining a non-public information store for a first entity, wherein the information store contains private data of the entity;

determining a privacy policy, wherein the privacy policy specifies a privacy release threshold for the number of entities required to share the requested information;

receiving an information request for information in the non-public information store;

determining at the embedded computer system a set of other entities willing to share the requested information;

comparing the number of these other entities against the privacy release threshold of the first entity to determine whether the requested information can be released; and determining automatically at the embedded computer system a privacy agreement defining access to the requested information in the non-public information store based on the privacy policy.

17. The method of claim 16, wherein the privacy policy comprises at least one of: minimum number of entities in the set and acceptable consideration for disclosing information associated with privacy policies.

18. A method of anonymizing information performed by an embedded computer system for protecting private information, comprising:

determining a non-public information store for a first user, wherein the information store contains user-input private data;

determining a privacy policy, wherein the privacy policy specifies a privacy release threshold for the number of users required to share the requested information;

receiving an information request for information in the non-public information store;

determining a privacy impact indicator based on the effect of disclosing the requested information;

determining a privacy agreement defining access to the requested information in the non-public information store based on the privacy policy;

determining at the embedded computer system the number of other users willing to share the requested information;

comparing the number of these other users against the user privacy release threshold of the first user to determine whether the requested information can be released; and determining automatically at the embedded computer system anonymizing transformations of the requested information based on at least one of: the determined privacy agreement, the privacy policy, and the privacy impact indicator.

19. The method of claim 18, in which the information request is at least one of: transaction information; personal information; financial information; and location information.

20. The method of claim 1, in which the transaction information is at least one of:
credit card;
purchase;
sale;
refund;
merchandise return;
coupon; and
discount information.

21. The method of claim 1, in which the personal information is at least one of:
demographic;
health;
financial;
political affiliation, criminal record, religious belief, location;
and ownership information.

22. The method of claim 1, in which the financial information is at least one of:
a FICO score,
home ownership,
stock ownership,
bond ownership,
mortgage,
bank account,
credit score,
income,
family income,
investments; and
business ownership information.

23. The method of claim 19, in which location information is at least one of: inferred location information and specific location information.

24. The method of claim 23, in which the inferred location information is based on at least one of: geo-coded communication information; machine type information; pattern information and signal strength information.

25. The method of claim 23, in which explicit location information is based on at least one of global positioning system information; cellular antenna information; video information; sound information; and biometric information.

26. The method of claim 19, in which the privacy policy is a computer readable privacy profile.

27. The method of claim 19, in which the privacy policy is at least one of:
an XML privacy profile; a computer-readable privacy policy and a platform for privacy preferences conforming privacy policy.

28. The method of claim 19, in which the privacy impact indicator is displayed to the user using at least one of: a mobile device; a static device and a document.

29. The method of claim 19, in which the privacy policy is located in at least one of: a mobile device; a gateway device; a personal computer; a central repository and a server.

30. The method of claim 19, in which the agreement includes a transfer of value for access to the anonymized non-public information.

31. The method of claim 19, in which the agreement includes a transfer of value for access to the non-public information.

32. The method of claim 19, in which the agreement includes a transfer of varying value for access to non-public information of varying degrees of anonymity.

33. A method of anonymizing non-public information performed by an embedded computer system for protecting private information, comprising:
receiving a request for information from a non-public information store of a first entity;
determining the privacy policy for the information store, wherein the privacy policy specifies a privacy release threshold for the number of entities required to share the requested information;
determining anonymizing transformations of the information based on the privacy policy;
determining anonymized non-public information based on the anonymizing transformations;
determining a privacy impact indicator based on the anonymized non-public information and public information;
determining at the embedded computer system a set of other entities willing to share the requested information;
comparing the number of these other entities against the privacy release threshold of the first entity to determine whether the requested information can be released; and
determining automatically at the embedded computer system the disclosure of anonymized non-public information based on the privacy impact indicator.

34. The method of claim 33, in which the information request is at least one of: transaction information; personal information; financial information; and location information.

35. The method of claim 9, in which the information request is at least one of: transaction information; personal information; financial information; and location information.

36. The method of claim 1, in which the information request is at least one of: transaction information; personal information; financial information; and location information.

37. The method of claim 16, in which the information request is at least one of: transaction information; personal information; financial information; and location information.

38. A system for anonymizing information comprising:
an input/output circuit that receives a request for at least one information feature from the non-public information store of a first entity;
a memory;
a processor that determines a privacy policy for the first entity; and a set of other entities willing to share the requested information feature based on privacy policies associated with each entity in the set of entities and compares the number of these other entities against a privacy release threshold for the number of entities required to shared the requested information specified in a privacy policy of the first entity to determine whether the requested information can be released; and which determines an aggregated response to the request for at least one information feature from the non-public information store based on the set of entities.

39. The system of claim 38, in which the aggregated response is further based on at least one of: privacy policy for the requestor of information and publicly available information.

40. The system of claim 38, wherein the set of entities willing to share the information feature are determined using at least one of: a trusted third party and cryptographic matching protocols.

41. The system of claim 40, wherein the number of entities in the set is based on the privacy policy information.

42. The system of claim 39, wherein the request for at least one information feature from the information store originates from at least one of: a vendor; a service provider; a family member; and an acquaintance.

43. The system of claim 38, wherein the privacy policy is at least one of: determined by a user and computed.

44. The system of claim 38, wherein the information store is stored in at least one of: a file; a relational database and a data structure.

45. The system of claim 38, wherein the information store is located in at least one of: a mobile device; a personal computer; a workstation; a server; a gateway and a home portal.

46. A system of indicating the effect of disclosing information comprising:
an input/output circuit that receives a request for a request for information from the non-public information store of a first user;
a memory;
a processor that determines the user privacy policy, the number of other users willing to share the requested information and compares the number of these other users against a privacy release threshold for the number of users required to shared the requested information specified in a privacy policy of the first user to determine whether the requested information can be released, and a privacy impact indicator based on the effect of disclosing the requested information and the privacy policy.

47. The system of claim 46, in which the privacy impact indicator is further based on at least one of: privacy policy for the requestor of information and publicly available information.

48. The system of claim 46, in which the privacy impact indicator is displayed.

49. The system of claim 48, wherein the privacy impact indicator is associated with at least one of: a visual, aural, tactile and olfactory display attribute.

50. The system of claim 49, wherein the visual privacy impact indicator is a user interface component.

51. The system of claim 50, wherein the privacy impact indicator is at least one of: a dial; a gauge; a meter; and a thermometer.

52. The system of claim 49, wherein the aural privacy impact indicator is at least one of: a frequency; a tone, a duration; and a beat.

53. A system of sharing information comprising the steps of:
an input/output circuit that receives a request for information in the non-public information store of a first user;
a memory;
a processor that determines the number of other users willing to share the requested information and compares the number of these other users against a privacy release threshold for the number of users required to shared the requested information specified in a privacy policy of the first user to determine whether the requested information can be released, and a privacy agreement defining access to the requested information in the non-public information store based on the request for information and the privacy policy.

54. The system of claim 53, wherein the privacy policy comprises at least one of: minimum number of entities in the set and acceptable consideration for disclosing information associated with privacy policies.

55. A system of anonymizing information comprising:
an input/output circuit that receives a request for information in the non-public information store of a first user;
a memory;
a processor that determines the number of other users willing to share the requested information and compares the number of these other users against a privacy release threshold specified in a privacy policy of the first user to determine whether the requested information can be released, and a privacy impact indicator based on at least one of: a privacy and the effect of disclosing the requested information; and a privacy agreement defining access to the requested information in the non-public information store based on the privacy policy; and which determines anonymizing transformations of the requested information based on at least one of: the determined privacy agreement, the privacy policy; and the privacy impact indicator.

56. The system of claim 55, in which the information request is at least one of: transaction information; personal information; financial information; and location information.

57. The system of claim 38, in which the transaction information is at least one of:
credit card;
purchase;
sale;
refund;
merchandise return;
coupon;
and discount information.

58. The system of claim 38, in which the personal information is at least one of:
demographic;
health;
financial;
political affiliation, criminal record, religious belief, location; and
ownership information.

59. The system of claim 38, in which the financial information is at least one of:
a FICO score,
home ownership,
stock ownership,
bond ownership,
mortgage,
bank account,
credit score,
income,
family income,
investments and
business ownership information.

60. The system of claim 56, in which location information is at least one of: inferred location information and specific location information.

61. The system of claim 60, in which the inferred location information is based on at least one of: geo-coded communication information; machine type information; pattern information and signal strength information.

62. The system of claim 60, in which explicit location information is based on at least one of global positioning system information; cellular antenna information; video information; sound information; and biometric information.

63. The system of claim 56, in which the privacy policy is a computer readable privacy profile.

64. The system of claim 56, in which the privacy policy is at least one of:
an XML privacy profile; a computer-readable privacy policy and a platform for privacy preferences conforming privacy policy.

65. The system of claim 56, in which the privacy impact indicator is displayed to the user using at least one of: a mobile device; a static device and a document.

66. The system of claim 56, in which the privacy policy is located in at least one of: a mobile device; a gateway device; a personal computer; a central repository and a server.

67. The system of claim 56, in which the agreement includes a transfer of value for access to the anonymized non-public information.

68. The system of claim 56, in which the agreement includes a transfer of value for access to the non-public information.

69. The system of claim 56, in which the agreement includes a transfer of varying value for access to non-public information of varying degrees of anonymity.

70. A system of anonymizing non-public information comprising:
- an input/output circuit that receives a request for information in the non-public information store of a first user;
- a memory;
- a processor that determines:
  - the number of other users willing to share the requested information, thereby comparing the number of these other users against a privacy release threshold for the number of users required to shared the requested information specified in a privacy policy of the first user to determine whether the requested information can be released;
  - the privacy policy for the information store;
  - anonymizing transformations of the information based on the privacy policy;
  - anonymized non-public information based on the anonymizing transformations;
  - a privacy impact indicator based on the anonymized non-public information and public information; and
  - which determines the disclosure of anonymized non-public information based on the privacy impact indicator.

71. The system of claim 70, in which the information request is at least one of: transaction information; personal information; financial information; and location information.

72. The system of claim 46, in which the information request is at least one of: transaction information; personal information; financial information; and location information.

73. The system of claim 38, in which the information request is at least one of: transaction information; personal information; financial information; and location information.

74. The system of claim 53, in which the information request is at least one of: transaction information; personal information; financial information; and location information.

75. A system for anonymizing information comprising:
- a means for determining a non-public information store for a first entity;
- a means for determining a request for at least one information feature from the non-public information store;
- a means for determining a privacy policy for the first entity, wherein the privacy policy specifies a privacy release threshold for the number of entities required to share the requested information;
- a means for determining a set of other entities willing to share the requested information feature based on privacy policies associated with each entity in the set of entities and comparing the number of these other entities against the privacy release threshold of the first entity to determine whether the requested information can be released; and
- a means for determining an aggregated response to the request for at least one information feature from the non-public information store based on the set of entities.

76. A system for indicating the effect of disclosing information comprising:
- a means for determining a non-public information store;
- a means for determining a privacy policy for a first user, wherein the privacy policy specifies a privacy release threshold for the number of users required to share the requested information;
- a means for determining an information request for information in the non-public information store;
- a means for determining the number of other users willing to share the requested information and comparing the number of these other users against the privacy release threshold of the first user to determine whether the requested information can be released; and
- a means for determining a privacy impact indicator based on the effect of disclosing the requested information and the privacy policy.

77. A system for sharing information comprising:
- a means for determining a non-public information store for a first user;
- a means for determining a privacy policy, wherein the privacy policy specifies a privacy release threshold for the number of users required to share the requested information;
- a means for determining an information request for information in the non-public information store;
- a means for determining the number of other users willing to share the requested information and comparing the number of these other users against the privacy release threshold of the first user to determine whether the requested information can be released; and
- a means for determining a privacy agreement defining access to the requested information in the non-public information store based on the privacy policy.

78. A system for anonymizing information comprising:
- a means for determining a non-public information store for a first user;
- a means for determining a privacy policy, wherein the privacy policy specifies a privacy release threshold for the number of users required to share the requested information;
- a means for determining an information request for information in the non-public information store;
- a means for determining a privacy impact indicator based on the effect of disclosing the requested information;
- a means for determining a privacy agreement defining access to the requested information in the non-public information store based on the privacy policy;
- a means for determining the number of other users willing to share the requested information and comparing the number of these other users against the privacy release threshold of the first user to determine whether the requested information can be released; and
- a means for determining anonymizing transformations of the requested information based on at least one of: the determined privacy agreement, the privacy policy; and the privacy impact indicator.

79. A system for anonymizing non-public information comprising:
- a means for determining a request for information from a non-public information store of a first user;
- a means for determining the privacy policy for the information store wherein the privacy policy specifies a privacy release threshold for the number of users required to share the requested information;
- a means for determining anonymizing transformations of the information based on the privacy policy;

a means for determining anonymized non-public information based on the anonymizing transformations;

a means for determining a privacy impact indicator based on the anonymized non-public information and public information;

a means for determining the number of other users willing to share the requested information and comparing the number of these other users against the privacy release threshold of the first user to determine whether the requested information can be released; and a means for determining the disclosure of anonymized non-public information based on the privacy impact indicator.

80. Computer readable storage medium comprising: computer readable program code embodied on the computer readable storage medium, the computer readable program code usable to program a computer for anonymizing information, comprising the steps of:

determining a non-public information store for a first entity;

determining a request for at least one information feature from the non-public information store;

determining a privacy policy for the first entity, wherein the privacy policy specifies a privacy release threshold for the number of entities required to share the requested information;

determining a set of other entities willing to share the requested information feature based on privacy policies associated with each entity in the set of entities and comparing the number of these other entities against the privacy release threshold of the first entity to determine whether the requested information can be released; and determining an aggregated response to the request for at least one information feature from the non-public information store based on the set of entities.

81. Computer readable storage medium comprising: computer readable program code embodied on the computer readable storage medium, the computer readable program code usable to program a computer for indicating the effect of disclosing information comprising the steps of:

determining a non-public information store;

determining a privacy policy for a first user, wherein the privacy policy specifies a privacy release threshold for the number of users required to share the requested information;

determining an information request for information in the non-public information store;

determining the number of other users willing to share the requested information and comparing the number of these other users against the privacy release threshold of the first user to determine whether the requested information can be released; and determining a privacy impact indicator based on the effect of disclosing the requested information and the privacy policy.

82. Computer readable storage medium comprising: computer readable program code embodied on the computer readable storage medium, the computer readable program code usable to program a computer for sharing information comprising the steps of:

determining a non-public information store for a first user;

determining a privacy policy, wherein the privacy policy specifies a privacy release threshold for the number of users required to share the requested information;

determining an information request for information in the non-public information store;

determining the number of other users willing to share the requested information and comparing the number of these other users against the privacy release threshold of the first user to determine whether the requested information can be released; and determining a privacy agreement defining access to the requested information in the non-public information store based on the privacy policy.

83. Computer readable storage medium comprising: computer readable program code embodied on the computer readable storage medium, the computer readable program code usable to program a computer for anonymizing information comprising the steps of:

determining a non-public information store for a first user;

determining a privacy policy, wherein the privacy policy specifies a privacy release threshold for the number of users required to share the requested information;

determining an information request for information in the non-public information store;

determining the number of other users willing to share the requested information; and comparing the number of these other users against the privacy release threshold of the first user to determine whether the requested information can be released;

determining a privacy impact indicator based on the effect of disclosing the requested information;

determining a privacy agreement defining access to the requested information in the non-public information store based on the privacy policy;

determining anonymizing transformations of the requested information based on at least one of: the determined privacy agreement, the privacy policy;

and the privacy impact indicator.

84. Computer readable storage medium comprising: computer readable program code embodied on the computer readable storage medium, the computer readable program code usable to program a computer for anonymizing non-public information comprising the steps of:

determining a request for information from a non-public information store of a first user;

determining the number of other users willing to share the requested information; and comparing the number of these other users against a privacy release threshold for the number of users required to shared the requested information specified in a privacy policy of the first user to determine whether the requested information can be released;

determining the privacy policy for the information store;

determining anonymizing transformations of the information based on the privacy policy;

determining anonymized non-public information based on the anonymizing transformations;

determining a privacy impact indicator based on the anonymized non-public information and public information; and determining the disclosure of anonymized non-public information based on the privacy impact indicator.

* * * * *